US 11,736,168 B2

(12) United States Patent
Kuriyama et al.

(10) Patent No.: US 11,736,168 B2
(45) Date of Patent: Aug. 22, 2023

(54) WIRELESS COMMUNICATION SYSTEM, WIRELESS COMMUNICATION METHOD, TRANSMITTING STATION DEVICE AND RECEIVING STATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Masafumi Yoshioka, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/636,180

(22) PCT Filed: Sep. 6, 2019

(86) PCT No.: PCT/JP2019/035252
§ 371 (c)(1),
(2) Date: Feb. 17, 2022

(87) PCT Pub. No.: WO2021/044625
PCT Pub. Date: Mar. 11, 2021

(65) Prior Publication Data
US 2022/0294506 A1    Sep. 15, 2022

(51) Int. Cl.
*H04B 7/06*    (2006.01)
*H04B 7/0413*    (2017.01)

(52) U.S. Cl.
CPC ......... *H04B 7/0617* (2013.01); *H04B 7/0413* (2013.01)

(58) Field of Classification Search
CPC ............................ H04B 7/0617; H04B 7/0413
See application file for complete search history.

(56) References Cited

U.S. PATENT DOCUMENTS 7,860,183 B2 * 12/2010 Maltsev ................ H04L 5/0048
375/267
2006/0286955 A1 * 12/2006 Yoshida ............... H04B 7/0854
455/140

(Continued)

FOREIGN PATENT DOCUMENTS

WO    WO-2014115374 A1    7/2014
WO    WO-2018030243 A1    2/2018

(Continued)

OTHER PUBLICATIONS

Keita Kuriyama, Hayato Fukuzono, Masafumi Yoshioka, Tsutomu Tatsuta, "FIR-gata soushin biimu keisei to souhoukou jyushin touka wo tekiyoushita koutaiiki singuru kyaria MIMO sisutemu" (in Japanese), "Wide-band Single-Carrier MIMO System Using FIR-type Transmit Beamforming and Bi-Directional Receive Equalization", IEICE General Conference, B-5-105, 2019, Mar. 22, 2019.

*Primary Examiner* — Janice N Tieu
(74) *Attorney, Agent, or Firm* — Harness, Dickey & Pierce, P.L.C.

(57) ABSTRACT

A transmitting station device at least comprises a training signal generation unit, and a receiving station device at least comprises a communication path estimation unit which estimates a communication path response from the known signal, and a beam forming unit which performs a beam forming process using a weight to suppress inter-stream interference, a channel fluctuation amount calculation unit which calculates as a channel fluctuation amount a difference between the communication path responses estimated in a manner of one following another in time, and a weight calculation unit which calculates a new weight using an (Continued)

updated value of the weight calculated based on the channel fluctuation amount are included in one of the transmitting station device and the receiving station device. This can significantly reduce the amount of calculation related to update of a weight.

8 Claims, 10 Drawing Sheets

(56) References Cited

U.S. PATENT DOCUMENTS

| | | | |
|---|---|---|---|
| 2013/0182787 A1* | 7/2013 | Kakishima | H04B 7/0652 375/267 |
| 2014/0154992 A1* | 6/2014 | Silverman | H04W 16/28 455/63.4 |
| 2015/0358103 A1 | 12/2015 | Ohwatari et al. | |
| 2016/0119909 A1* | 4/2016 | Fukuzono | H04B 17/318 370/329 |
| 2019/0165986 A1 | 5/2019 | Saito et al. | |
| 2019/0222246 A1 | 7/2019 | Takahashi et al. | |
| 2019/0386713 A1* | 12/2019 | Yoshioka | H04B 7/0408 |
| 2020/0036423 A1* | 1/2020 | Athley | H04B 7/0626 |
| 2020/0259609 A1 | 8/2020 | Saito et al. | |
| 2022/0014245 A1* | 1/2022 | Wigren | H04B 7/0695 |

FOREIGN PATENT DOCUMENTS

| | | |
|---|---|---|
| WO | WO-2018073851 A1 | 4/2018 |
| WO | WO-2019030913 A1 | 2/2019 |

* cited by examiner

WIRELESS COMMUNICATION SYSTEM, WIRELESS COMMUNICATION METHOD, TRANSMITTING STATION DEVICE AND RECEIVING STATION DEVICE

CROSS-REFERENCE TO RELATED APPLICATIONS

This application is a 371 U.S. National Phase of International Application No. PCT/JP2019/035252, filed on Sep. 6, 2019. The entire disclosure of the above application is incorporated herein by reference.

TECHNICAL FIELD

The present invention relates to a technique for updating a transmission weight used for forming a transmission beam in a wireless communication system which performs wideband single carrier MIMO (SC-MIMO: Single Carrier Multiple-Input Multiple-Output) transmission.

BACKGROUND ART

When performing wideband SC-MIMO transmission under a communication environment with frequency selective fading, it is necessary to perform a process of suppressing inter-stream interference caused by the spatial spread of a plurality of antennas, and inter-symbol interference caused by the temporal spread of communication path characteristics.

Therefore, a technique of forming an FIR (Finite Impulse Response) type transmission beam in the time domain and suppressing inter-stream interference has been studied (for example, see Non-Patent Literature 1).

CITATION LIST

Non-Patent Literature

Non-Patent Literature 1: Keita Kuriyama, Hayato Fukuzono, Masafumi Yoshioka, Tsutomu Tatsuta, "FIR-gata soushin biimu keisei to souhoukou jyushin touka wo tekiyoushita koutaiiki singuru kyaria MIMO sisutemu (in Japanese)" (Wide-band Single-Carrier MIMO System Using FIR-type Transmit Beamforming and Bi-Directional Receive Equalization), IEICE General Conference, B-5-105, 2019.

SUMMARY OF THE INVENTION

Technical Problem

However, since the transmission weight used for forming the transmission beam is calculated based on the transfer function matrix of the communication path response (CIR: Channel Impulse Response) expressing the broadband MIMO channel information in the time domain, there is a problem that the amount of calculation for calculating the transmission weight becomes huge depending on the number of transmitting antennas and receiving antennas, the number of paths for each channel between a plurality of antennas, and the like. Moreover, a huge amount of calculation is required every time the transmission weight is updated. In the above description, the case where the beam forming process is performed on the transmitting side has been described, but the same applies to the case where the beam forming process is performed on the receiving side.

An object of the present invention is to provide a wireless communication system, a wireless communication method, a transmitting station device, and a receiving station device, that can, in a wireless communication system which performs wideband SC-MIMO transmission, significantly reduce the amount of calculation related to update of a weight, by calculating an update value of the weight used in the beam forming process performed at the transmitting station device or the receiving station device based on the channel fluctuation amount between the communication path responses estimated in a manner of one following another in time, and further, calculating the update value using only the path for the channel with the large fluctuation amount.

Means for Solving the Problem

The present invention is a wireless communication system which performs single carrier MIMO transmission, wherein a transmitting station device at least includes a training signal generation unit which generates a known signal, and a receiving station device at least includes a communication path estimation unit which estimates a communication path response from the known signal transmitted by the transmitting station device, and a beam forming unit which performs a beam forming process using a weight to suppress inter-stream interference, a channel fluctuation amount calculation unit which calculates as a channel fluctuation amount a difference between the communication path responses estimated in a manner of one following another in time by the communication path estimation unit, and a weight calculation unit which calculates a new weight using an updated value of the weight calculated based on the channel fluctuation amount are included in one of the transmitting station device and the receiving station device.

The present invention is a wireless communication method for performing single carrier MIMO transmission, wherein a transmitting station device at least performs a training signal generation process for generating a known signal, and a receiving station device at least performs a communication path estimation process for estimating a communication path response from the known signal transmitted by the transmitting station device, and a beam forming process for performing a beam forming using a weight to suppress inter-stream interference, a channel fluctuation amount calculation process for calculating as a channel fluctuation amount a difference between the communication path responses estimated in a manner of one following another in time by the communication path estimation process, and a weight calculation process for calculating a new weight using an updated value of the weight calculated based on the channel fluctuation amount are performed by one of the transmitting station device and the receiving station device.

The present invention is a transmitting station device which performs single carrier MIMO transmission between the transmitting station device and a receiving station device, including a training signal generation unit which generates a known signal, a beam forming unit which performs a beam forming process using a weight to suppress inter-stream interference, a channel fluctuation amount calculation unit which calculates as a channel fluctuation amount a difference between the communication path responses estimated in a manner of one following another in time by the receiving station device which receives the known signal, and a weight calculation unit which calculates a new weight using an updated value of the weight calculated based on the channel fluctuation amount.

The present invention is a receiving station device which performs single carrier MIMO transmission which performs a beam forming process using a weight to suppress interstream interference, including a communication path estimation unit which estimates a communication path response from a known signal received from the transmitting station device, a channel fluctuation amount calculation unit which calculates as a channel fluctuation amount a difference between the communication path responses estimated in a manner of one following another in time by the communication path estimation unit, and a weight calculation unit which calculates a new weight using an updated value of the weight calculated based on the channel fluctuation amount, and when the beam forming process is performed on the side of the receiving station device, outputs the new weight to the beam forming unit, and when the beam forming process is performed on the side of the transmitting station device, transmits the new weight to the transmitting station device.

Effects of the Invention

The wireless communication system, the wireless communication method, the transmitting station device, and the receiving station device according to the present invention can, in a wireless communication system which performs wideband SC-MIMO transmission, significantly reduce the amount of calculation related to update of a weight, by calculating an update value of the weight used in the beam forming process performed at the transmitting station device or the receiving station device based on the channel fluctuation amount between the communication path responses estimated in a manner of one following another in time, and further, calculating the update value using only the path for the channel with the large fluctuation amount.

DESCRIPTION OF EMBODIMENTS

Hereinafter, embodiments of a wireless communication system, a wireless communication method, a transmitting station device, and a receiving station device according to the present invention are described with reference to the drawings.

Figure 1:
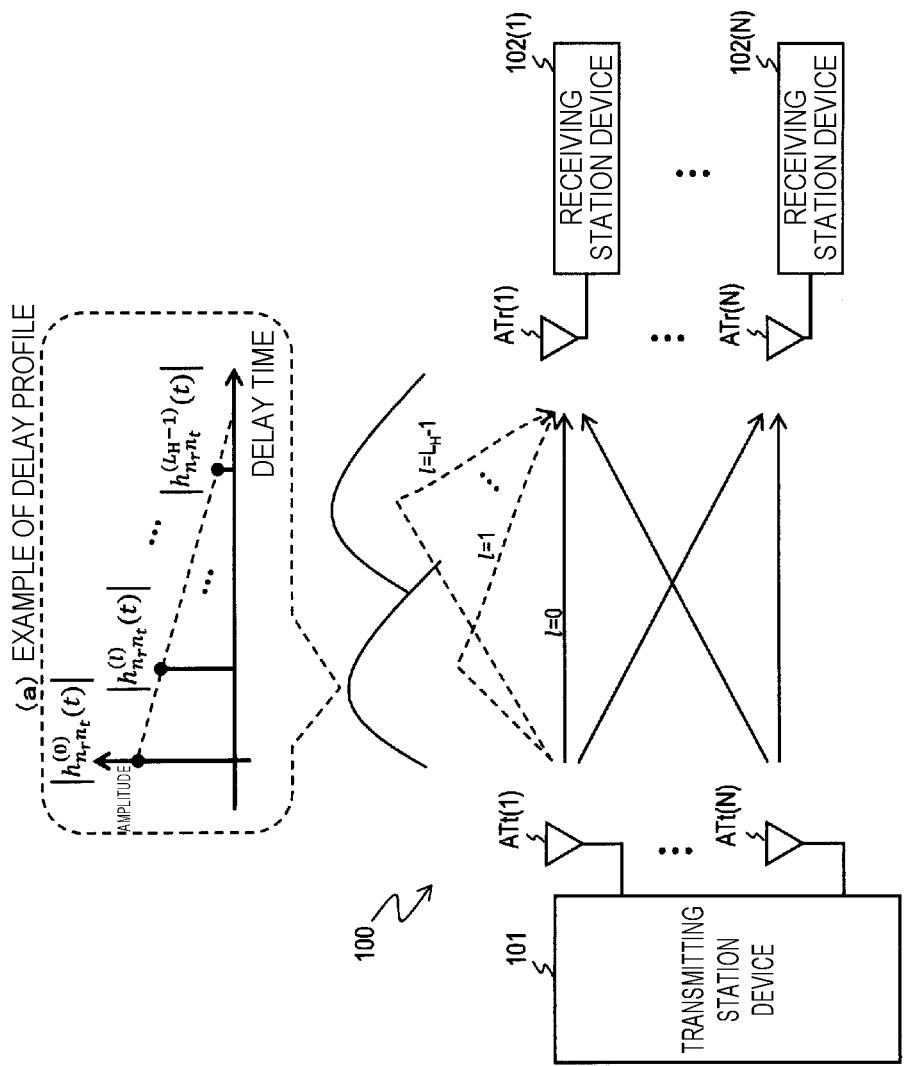
FIG. 1 is a diagram showing an example of a system model of a wireless communication system according to the present embodiment.

FIG. 1 shows an example of a system model of a wireless communication system 100 according to the present embodiment. In FIG. 1, a transmitting station device 101 has N antennas (N is an integer ≥2) from an antenna ATt(1) to an antenna ATt(N), and performs broadband single carrier MIMO transmission between the transmitting station device 101 and N receiving station devices 102 from a receiving station device 102(1) having an antenna ATr(1) to a receiving station device 102(N) having an antenna ATr(N). FIG. 1 shows an example of MU (Multi User)-MIMO in which the transmitting station device 101 communicates with N receiving station devices 102, but the technique described in the present embodiment can be applied to the case of SU (Single User)-MIMO as well.

Here, when a description is given which is common to the receiving station device 102(1) to the receiving station device 102(N), (number) at the end of the reference numeral is omitted to denote as the receiving station device 102, and when a specific receiving station device 102 is referred to, (number) is added to the end of the reference numeral to denote as, for example, the receiving station device 102(1). The antenna ATt(1) to the antenna ATt(N) of the transmitting station device 101 and the antenna ATr(1) to the antenna ATr(N) of the receiving station device 102 are also denoted in the same manner.

In FIG. 1, for example, for the channel between the antenna ATt(1) of the transmitting station device 101 and the antenna ATr(1) of the receiving station device 102(1), one direct wave and $L_H-1$ indirect waves (multipaths), that is, a total of $L_H$ paths exist. Similarly, for each channel between the antenna ATt(1) and the antenna ATr(2), between the antenna ATt(2) and the antenna ATr(1), and between the antenna ATt(2) and the antenna ATr(2), multiple paths exist respectively. Here, in the following description, the route between each of the antennas ATt(1) to ATt(N) on the transmitting station device 101 side and each of the antennas ATr(1) to ATr(N) on the receiving station device 102 side is referred to as a channel, and the direct wave or the indirect wave for each channel is referred to as a path.

In FIG. 1, the balloon portion (a) shows an example of a delay profile with respect to $L_H$ paths for the channel between the antenna ATt($n_t$) and the antenna ATr($n_r$). In the delay profile shown in (a), for example, the CIR of the direct wave (0th path) at the time t is represented by the expression (1).

[Math. 1]

$$|h_{n_r,n_t}^{(0)}(t)| \tag{1}$$

Similarly, the CIR of the l-th path and the CIR of the $L_H-1$-th path are represented by the expressions (2) and (3) respectively. l is an integer of $0 \leq l \leq L_H-1$ ($L_H$ is a positive integer), and $L_H$ indicates the number of paths between the $n_r$-th receiving antenna and the $n_t$-th transmitting antenna.

[Math. 2]

$$|h_{n_r n_t}^{(l)}(t)| \quad (2)$$

[Math. 3]

$$|h_{n_r n_t}^{(L_H-1)}(t)| \quad (3)$$

Here, in the expressions (1) to (3), $n_r$ is an integer of $1 \leq n_r \leq N$, and $n_t$ is an integer of $1 \leq n_t \leq N$. The subscripts $n_r$ and $n_t$ of the symbols h indicating the CIR of each path are, when described in the document, denoted as nr and nt, such as $h_{nrnt}$, $H_{nrnt}$, $\Delta_{nrnt}$, $W_{nrnt}$, and the like, which are described later, are also denoted in the same manner.

Then, the CIR (transfer function $H_{nrnt}(z, t)$ between the $n_r$-th antenna ATr($n_r$) of the transmitting station device 101 and the $n_t$-th antenna ATt ($n_t$) of the receiving station device 102 at the time t is the sum of the CIRs of the $L_H$ paths shown in the expressions (1) to (3), and is represented by the expression (4).

[Math. 4]

$$H_{n_r n_t}(z, t) = \sum_{l=0}^{L_H-1} h_{n_r n_t}^{(l)}(t) z^{-l} \quad (4)$$

Here, $Z^{-1}$: z is a variable of the Z-transform, and indicates a delay operator which performs the time shift of the 1-th path.

Then, the CIR (transfer function matrix H(z, t)) between the N antennas ATt on the transmitting station device 101 side and the N antennas ATr on the receiving station device 102 side is represented by the expression (5) including as an element the CIR of N×N channels from $H_{11}(z, t)$ to $H_{NN}(Z, t)$ in the expression (4).

[Math. 5]

$$H(z, t) = \begin{bmatrix} H_{11}(z, t) & \ldots & H_{1N}(z, t) \\ \vdots & \ddots & \vdots \\ H_{N1}(z, t) & \ldots & H_{NN}(z, t) \end{bmatrix} \quad (5)$$

Here, the inverse matrix of H(z, t) is represented by the expression (6).

[Math. 6]

$$H(z, t)^{-1} = \frac{1}{\det(H(z, t))} adj(H(z, t)) \quad (6)$$

In the expression (6), det(·) and adj(·) represent a determinant and a transposed adjugate matrix respectively. Here, the transposed adjugate matrix is also called an adjugate matrix. adj is different from an adjoint matrix which represents Hermitian transpose. The transposed adjugate matrix adj(H(z, t)) is a matrix having N×N elements as follows.

$$adj(H(z,t)) \in \mathbb{C}^{N \times N} \quad [\text{Math. 7}]$$

Here, it is known that by using the transposed adjugate matrix adj(H(z, t)) as the transmission weight for the transmission beam forming, the transfer function matrix H(z, t) is diagonalized, and as shown in the expression (7), each diagonal element is equal to the determinant det(H(z, t)) (for example, see Non-Patent Literature 1). I is an identity matrix. In the following description, basically, the case where the beam forming process is performed on the transmitting side is described, but the same applies to the case where the beam forming process is performed on the receiving side using the transmission weight as the reception weight.

[Math. 8]

$$H(z, t) adj(H(z, t)) = \det(H(z, t))I \quad (7)$$

$$= \begin{bmatrix} \det(H(z, t)) & 0 & \ldots & 0 \\ 0 & \ddots & \ddots & \vdots \\ \vdots & \ddots & \ddots & 0 \\ 0 & \ldots & 0 & \det(H(z, t)) \end{bmatrix}$$

In this way, by performing the transmission beam forming process using the transposed adjugate matrix adj(H(z, t)) as the transmission weight, the transfer function matrix H (z, t) is diagonalized, and the off-diagonal component representing the component of inter-stream interference (inter-user interference in the case of MU-MIMO) becomes 0, therefore inter-stream interference is suppressed. And, in the receiving station device 102, by performing the equalization process using the determinant det(H(z, t)) as the equalization weight, inter-symbol interference is suppressed.

Here, the case of 2×2 MIMO with N=2 is described as an example. In the expression (5) described above, the transfer function matrix H(z, t) of 2×2 MIMO is represented by the expression (8).

[Math. 9]

$$H(z, t) = \begin{bmatrix} H_{11}(z, t) & H_{12}(z, t) \\ H_{21}(z, t) & H_{22}(z, t) \end{bmatrix} \quad (8)$$

The transposed adjugate matrix adj(H(z, t)) of H(z, t) shown in the expression (8) is represented by the expression (9).

[Math. 10]

$$adj(H(z, t)) = \begin{bmatrix} H_{22}(z, t) & -H_{12}(z, t) \\ -H_{21}(z, t) & H_{11}(z, t) \end{bmatrix} \quad (9)$$

The determinant det (H (z, t)) of H (z, t) shown in the expression (8) is represented by the expression (10).

[Math. 11]

$$\det(H(z,t)) = H_{1,1}(z,t)H_{2,2}(z,t) - H_{2,1}(z,t)H_{1,2}(z,t) \quad (10)$$

Here, the above-described processing is for the CIR at the time t, and not for the CIR at the time t+τ. With the passage of time, channel fluctuation occurs in the CIR between the antennas, the off-diagonal component of the expression (7) does not become 0, and interference between residual streams occurs. Therefore, it is necessary to update the transmission weight, but when at least one of the number of antennas N and the number of paths $L_H$ for each channel between a plurality of antennas increases, the amount of calculation for the transmission weight (adj(H(z, t))) becomes huge, and a huge amount of calculation is required every time the transmission weight is updated. For example, as described below, even a slight change from 2×2 MIMO to 3×3 MIMO significantly increases the amount of calculation.

(Example of 3×3 MIMO)

The transfer function matrix H(z, t) of 3×3 MIMO is represented by the expression (11). This corresponds to the expression (8) of 2×2 MIMO.

[Math. 12]

$$H(z, t) = \begin{bmatrix} H_{11}(z, t) & H_{12}(z, t) & H_{13}(z, t) \\ H_{21}(z, t) & H_{22}(z, t) & H_{33}(z, t) \\ H_{31}(z, t) & H_{32}(z, t) & H_{33}(z, t) \end{bmatrix} \quad (11)$$

The transmission weight in this case is represented by the expression (12). This corresponds to the expression (9) of 2×2 MIMO.

[Math. 13]

$$adj(H(z, t)) = \begin{bmatrix} A_{11}(z, t) & A_{12}(z, t) & A_{13}(z, t) \\ A_{21}(z, t) & A_{22}(z, t) & A_{33}(z, t) \\ A_{31}(z, t) & A_{32}(z, t) & A_{33}(z, t) \end{bmatrix} \quad (12)$$

Here, $A_{ij}(z, t)$ represents each element of the transposed adjugate matrix of H(z, t), and for example, $A_{11}(z, t)$ is calculated as in the expression (13). In the expression (12), i and j are integers from 1 to 3.

[Math. 14]

$$A_{11}(z,t) = H_{22}(z,t)H_{33}(z,t) - H_{23}(z,t)H_{32}(z,t) \quad (13)$$

In this way, in the case of 3×3 MIMO, the amount of calculation significantly increases as compared with the case of 2×2 MIMO in the expression (9), and in the case of MIMO with N being 4 or more, the amount of calculation becomes further huge.

Therefore, the wireless communication system 100 according to the present embodiment reduces the amount of calculation by calculating, when updating the transmission weight, the difference between the communication path responses CIR (H(z)) estimated in a manner of one following another in time, and updating the transmission weight. In particular, the wireless communication system 100 according to the present embodiment reduces the amount of calculation by updating, when channel fluctuation occurs in only a part of the MIMO channels, the transmission weight using only the path for the channel with the large fluctuation amount.

Figure 2:
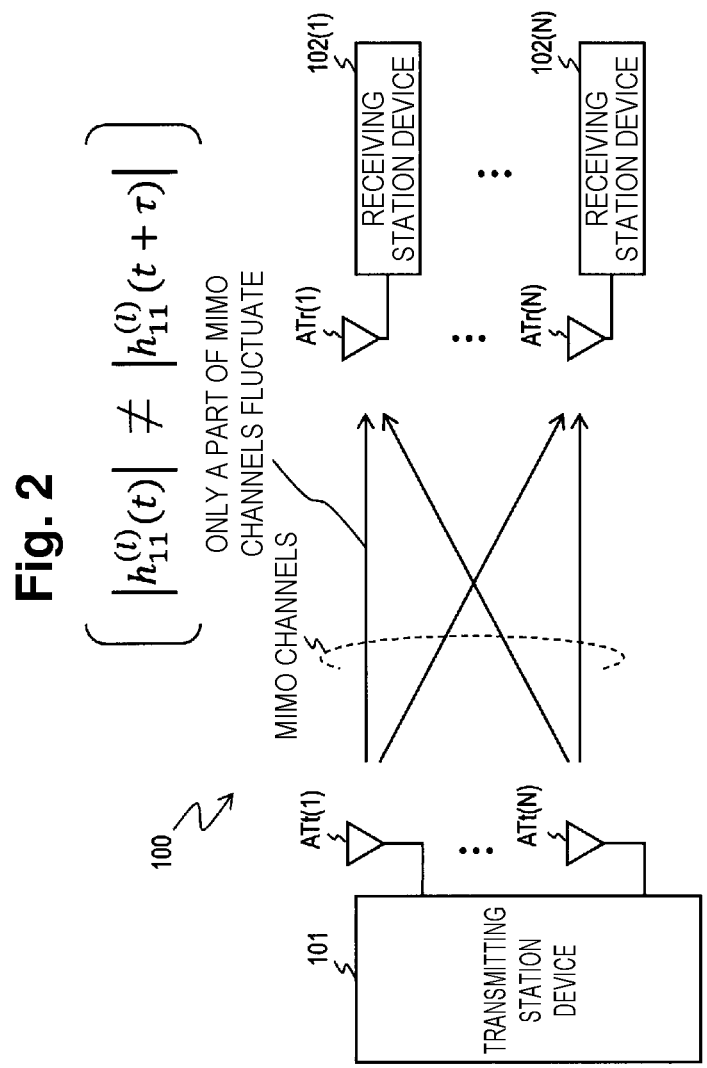
FIG. 2 is a diagram showing an example of a wireless communication system when fluctuation occurs in a part of the MIMO channels.

FIG. 2 shows an example of the wireless communication system 100 when fluctuation occurs in a part of the MIMO channels. The wireless communication system 100 shown in FIG. 2 is the same as the wireless communication system 100 in FIG. 1.

In the example of FIG. 2, in some channels (in the example of FIG. 2, the channel between the antenna ATt(1) and the antenna ATr(1)) among the MIMO channels between N antennas ATt from the antenna ATt(1) to the antenna ATt(N) of the transmitting station device 101 and N antennas ATr from the antenna ATr(1) to the antenna ATr(N) of the receiving station device 102, channel fluctuation occurs between the time t and the time t+τ. Actually, for the channel between the antenna ATt(1) and the antenna ATr(1), as described in FIG. 1, multiple paths exist, therefore fluctuation occurs in the CIR of each path. For example, as shown in FIG. 2, in the l-th path for the channel between the antenna ATt (1) and the antenna ATr(1), if the CIR ($|h_{11}^{(l)}(t+\tau)|$) at the time t+τ is different from the CIR ($|h_{11}^{(l)}(t)|$) at the time t, it can be seen that fluctuation occurs in the CIR of the l-th path.

Figure 3:
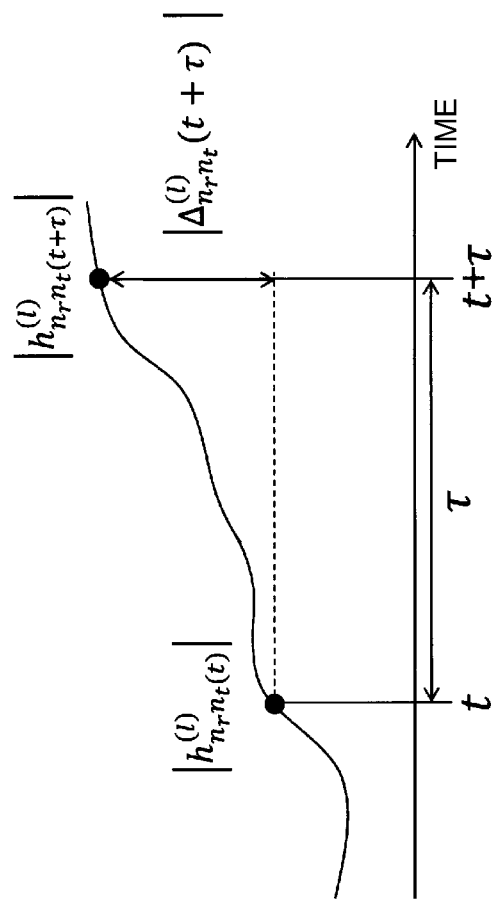
FIG. 3 is a diagram showing an example of fluctuation in the CIR of the l-th path between the $n_r$-th antenna of the receiving station device and the $n_t$-th antenna of the transmitting station device.

FIG. 3 shows an example of fluctuation in the CIR of the l-th path between the $n_r$-th antenna ATr of the receiving station device 102 and the $n_t$-th antenna ATt of the transmitting station device 101. In FIG. 3, the CIR of the l-th path between the $n_r$-th antenna ATr of the receiving station device 102 and the $n_t$-th antenna ATt of the transmitting station device 101 at the time t is represented by the expression (14).

[Math. 15]

$$|h_{n_r n_t(t)}^{(l)}| \quad (14)$$

Similarly, the CIR of the l-th path between the $n_r$-th antenna ATr of the receiving station device 102 and the $n_t$-th antenna ATt of the transmitting station device 101 at the time t+τ is represented by the expression (15).

[Math. 16]

$$|h_{n_r n_t(t+\tau)}^{(l)}| \quad (15)$$

The fluctuation amount of the l-th path in the channel between the $n_r$-th antenna ATr and the $n_t$-th antenna ATt at this time is represented by the expression (16) as the difference between the expression (14) and the expression (15).

[Math. 17]

$$|\Delta_{n_r n_t}^{(l)}(t+\tau)| \quad (16)$$

Here, the CIR transfer function matrix at the time t+τ can be represented by the expression (17).

[Math. 18]

$$H(z,t+\tau) = H(z,t) + \Delta(z,t+\tau) \quad (17)$$

In the expression (17), Δ(z, t+τ) is a transfer function matrix having as an element the fluctuation amount $\Delta_{nrnt}(z, t+\tau)$ of the channel between respective antennas from the time t to the time t+τ, and is represented by the expression (18).

[Math. 19]

$$\Delta(z, t+\tau) = \begin{bmatrix} \Delta_{11}(z, t+\tau) & \Delta_{12}(z, t+\tau) & \Delta_{13}(z, t+\tau) \\ \Delta_{21}(z, t+\tau) & \Delta_{22}(z, t+\tau) & \Delta_{23}(z, t+\tau) \\ \Delta_{31}(z, t+\tau) & \Delta_{32}(z, t+\tau) & \Delta_{33}(z, t+\tau) \end{bmatrix} \quad (18)$$

In the case of 3×3 MIMO, Δ(z, t+τ) is a matrix having 3×3 elements as follows.

$$\Delta(z,t+\tau) \in \mathbb{C}^{3\times 3} \quad \text{[Math. 20]}$$

At this time, the transmission weight at the time t+τ(adj (H(z, t+τ)))) is represented by the expression (19) using the transmission weight at the time t (adj(H(z, t))). The derivation process of the expression (19) is described in detail later.

[Math. 21]

$$adj(H(z,t+\tau)) = adj(H(z,t)) + W(z,t+\tau) \quad (19)$$

In the expression (19), W(z, t+τ) is a transfer function matrix showing the update value of the transmission weight having as an element $W_{nrnt}(z, t+\tau)$, as shown in the expression (20)

[Math. 22]
$$W(z, t+\tau) = \begin{bmatrix} W_{11}(z, t+\tau) & W_{12}(z, t+\tau) & W_{13}(z, t+\tau) \\ W_{21}(z, t+\tau) & W_{22}(z, t+\tau) & W_{23}(z, t+\tau) \\ W_{31}(z, t+\tau) & W_{32}(z, t+\tau) & W_{33}(z, t+\tau) \end{bmatrix} \quad (20)$$

In the case of 3×3 MIMO, W(z, t+τ) has 3×3 elements as follows.

$$W(z,t+\tau) \in \mathbb{C}^{3\times 3} \quad \text{[Math. 23]}$$

Here, each element $W_{nrnt}(z, t+\tau)$ of the update value W(z, t+τ) of the transmission weight can represent the difference between adj (H (z, t+τ)) and adj (H (z, t)) using $\Delta_{nrnt}$ (z, t+τ), and for example, $W_{11}(z, t+\tau)$ is calculated by the expression (21).

[Math. 24]

$$W_{11}(z,t+\tau) = \Delta_{22}(z,t+\tau)H_{33}(z,t) + H_{22}(z,t)\Delta_{33}(z,t+\tau)$$

$$-\Delta_{23}(z,t+\tau)H_{32}(z,t) - H_{23}(z,t)\Delta_{32}(z,t+\tau)$$

$$+\Delta_{22}(z,t+\tau)\Delta_{33}(z,t+\tau) - \Delta_{23}(z,t+\tau)\Delta_{32}(z,t+\tau) \quad (21)$$

In this way, the wireless communication system 100 according to the present embodiment calculates the update value of the transmission weight based on the channel fluctuation amount between the CIRs estimated in a manner of one following another in time, and adds the update value W(z, t+T) to the current transmission weight adj(H(z, t)) to calculate the updated transmission weight adj(H(z, t+τ)), therefore the amount of calculation can be reduced as compared with the case where the transmission weight is calculated directly.

Further, in the expression (18), when fluctuation occurs in a part of the channels, the fluctuation amount of the channel where fluctuation does not occur becomes 0, therefore the wireless communication system 100 according to the present embodiment can reduce the amount of calculation related to update of the transmission weight. For example, the wireless communication system 100 according to the present embodiment, as described later, can significantly reduce the amount of calculation for the update value of the transmission weight, by calculating as the channel fluctuation amount only the paths whose fluctuation amount exceeds a predetermined threshold, among a plurality of paths for the channel between the antenna $ATt(n_t)$ of the transmitting station device 101 and the antenna $ATr(n_r)$ of the receiving station device 102.

[Derivation Process of Expression (19)]

Next, the derivation process of the expression (19) is described in detail. For example, in the case of 3×3 MIMO of the expression (11), the transmission weight (adj(H(z, t))) is represented by the expression (22).

[Math. 25]

$$adj(H(z, t)) = \begin{bmatrix} H_{22}(z,t)H_{33}(z,t) - H_{23}(z,t)H_{32}(z,t) \\ H_{12}(z,t)H_{33}(z,t) - H_{13}(z,t)H_{32}(z,t) \\ H_{12}(z,t)H_{23}(z,t) - H_{13}(z,t)H_{22}(z,t) \\ H_{21}(z,t)H_{33}(z,t) - H_{23}(z,t)H_{31}(z,t) \\ H_{11}(z,t)H_{33}(z,t) - H_{13}(z,t)H_{31}(z,t) \\ H_{11}(z,t)H_{23}(z,t) - H_{13}(z,t)H_{21}(z,t) \\ H_{21}(z,t)H_{32}(z,t) - H_{22}(z,t)H_{31}(z,t) \\ H_{11}(z,t)H_{32}(z,t) - H_{12}(z,t)H_{31}(z,t) \\ H_{11}(z,t)H_{22}(z,t) - H_{12}(z,t)H_{21}(z,t) \end{bmatrix} \quad (22)$$

Here, in the expressions (17) and (18), it is assumed that the transmission weight (adj(H(z, t+τ))) is expressed by the expression (23).

[Math. 26]

$$adj(H(z, t+\tau)) = \begin{bmatrix} B_{11}(z, t) & B_{12}(z, t) & B_{13}(z, t) \\ B_{21}(z, t) & B_{22}(z, t) & B_{23}(z, t) \\ B_{31}(z, t) & B_{32}(z, t) & B_{33}(z, t) \end{bmatrix} \quad (23)$$

Each element of the expression (23) (for example, $B_{11}(z, t)$) is represented by the expression (24).

[Math. 27]

$$B_{11}(z,t) = \{H_{22}(z,t) + \Delta_{22}(z,t+\tau)\}\{H_{33}(z,t) + \Delta_{33}(z,t+\tau)\}$$

$$-\{H_{23}(z,t) + \Delta_{23}(z,t+\tau)\}\{H_{32}(z,t) + \Delta_{32}(z,t+\tau)\}$$

$$=H_{22}(z,t)H_{33}(z,t) - H_{23}(z,t)H_{32}(z,t)$$

$$+\Delta_{22}(z,t+\tau)H_{33}(z,t) + H_{22}(z,t)\Delta_{33}(z,t+\tau)$$

$$-\Delta_{23}(z,t+\tau)H_{32}(z,t) - H_{23}(z,t)\Delta_{32}(z,t+\tau)$$

$$+\Delta_{22}(z,t+\tau)\Delta_{33}(z,t+\tau) - \Delta_{23}(z,t+\tau)\Delta_{32}(z,t+\tau) \quad (24)$$

Here, assuming that the third and subsequent terms are $W_{11}(z, t+\tau)$, the expression (24) is represented by the expression (25).

[Math. 28]

$$B_{11}(z,t) = H_{22}(z,t)H_{33}(z,t) - H_{23}(z,t)H_{32}(z,t) + W_{11}(z,t+\tau)$$

$$=\Delta_{11}(z,t) + W_{11}(z,t+\tau) \quad (25)$$

In other words, by adding the update value $W_{11}(z, t+\tau)$ of the transmission weight to the transmission weight $A_{11}(z, t)$ at the time t, the transmission weight $B_{11}(z, t+\tau)$ at the time t+τ after the update can be calculated. The expression (19) is derived by considering also elements other than $B_{11}(z, t)$ in the same manner.

In this way, the wireless communication system 100 according to the present embodiment only needs to calculate the update value of the transmission weight consisting of the terms related to the channel fluctuation amount Δ(z, t+τ), therefore the amount of calculation is reduced as compared with the case where the transmission weight is calculated directly.

[Channel Fluctuation Amount and Threshold Determination]

Next, threshold determination is described in which the channel fluctuation amount $\Delta_{nrnt}(z, t+\tau)$ between the antenna $ATt(n_t)$ of the transmitting station device 101 and the antenna $ATr(n_r)$ of the receiving station device 102, and only the paths whose fluctuation amount exceeds a predetermined threshold, among a plurality of paths for each channel are used as the fluctuation amount of the channel.

Here, assuming that the number of paths $L_H$ of the channel between the antenna $ATt(n_t)$ and the antenna $ATr(n_r)$ is 3, the CIR ($H_{nrnt}$ (z, t)) at the time t and the CIR ($H_{nrnt}$ (z, t+τ)) at the time t+τ of the channel between the antenna ATt ($n_t$) and the antenna $ATr(n_r)$ are represented by the expressions (26) and (27), using the CIR of the 0th path, the CIR of the first path, and the CIR of the second path.

[Math. 29]

$$H_{n_r n_t}(z,t) = h_{n_r n_t}^{(0)}(t)z^{-0} + h_{n_r n_t}^{(1)}(t)z^{-1} + h_{n_r n_t}^{(2)}(t)z^{-2} \quad (26)$$

[Math. 30]

$$H_{n_r n_t}(z,t+\tau)=h_{n_r n_t}^{(0)}(t+\tau)z^{-0}+h_{n_r n_t}^{(1)}(t+\tau)z^{-1}+h_{n_r n_t}^{(2)}(t+\tau)z^{-2} \quad (27)$$

At this time, the difference $\Delta_{nrnt}(t+\tau)$ between the CIR at the time t and the CIR at the time t+τ is represented by the expression (28).

[Math. 31]

$$\Delta_{n_r n_t}(z,t+\tau)=\Delta_{n_r n_t}^{(0)}(t+\tau)z^{-0}+\Delta_{n_r n_t}^{(1)}(t+\tau)z^{-1}+\Delta_{n_r n_t}^{(2)}(t+\tau)z^{-1} \quad (28)$$

Here, in the present embodiment, the wireless communication system 100 has set a threshold in advance, and determines for each path 1 whether or not the absolute value $|\Delta_{nrnt}^{(1)}(t+\tau)|$ of the difference between the CIR at time t and the CIR at time t+τ exceeds the threshold.

For example, when the absolute value of the fluctuation amount exceeds the threshold only in the l=1st path among the $L_H$=3 paths, the expression (28) is represented by the expression (29).

[Math. 32]

$$\Delta_{n_r n_t}(z,t+\tau)=\Delta_{n_r n_t}^{(1)}(t+\tau)z^{-1} \quad (29)$$

In this way, among the $L_H$ paths for each channel of the MIMO channels, the path in which the absolute value of the fluctuation amount exceeds the threshold is used as the channel fluctuation amount between the antennas, so that the number of elements of the channel fluctuation amount is small, therefore the amount of calculation for the update value of the transmission weight is significantly reduced.

[Effect of Reducing Amount of Calculation]

Next, the effect of reducing the amount of calculation in the wireless communication system 100 according to the present embodiment is described taking the case of 3×3 MIMO as an example.

The CIR transfer function matrix H(z, t) at the time t is represented by the expression (11) as described above. Here, as an example, the case is described where among the respective elements of the expression (18), the fluctuation amount of the other channels other than the fluctuation amount $\Delta_{33}(z, t+\tau)$ of the channel between the antenna ATt(3) and the antenna Atr(3) is 0. In this case, the CIR transfer function matrix H(z, t+τ) at the time t+τ is represented by the expression (30) based on the expressions (17) and (18).

[Math. 33]

$$H(z, t+\tau) = H(z, t) + \begin{bmatrix} 0 & 0 & 0 \\ 0 & 0 & 0 \\ 0 & 0 & \Delta_{33}(z, t+\tau) \end{bmatrix} \quad (30)$$

At this time, the transmission weight adj(H(z, t)) is represented by the expression (31) based on the expression (19).

[Math. 34]

$$adj = (H(z, t+\tau)) =$$

$$adj(H(z, t)) + \begin{bmatrix} H_{22}(z, t)\Delta_{33}(z, t+\tau) & -H_{12}(z, t)\Delta_{33}(z, t+\tau) & 0 \\ -H_{21}(z, t)\Delta_{33}(z, t+\tau) & H_{11}(z, t)\Delta_{33}(z, t+\tau) & 0 \\ 0 & 0 & 0 \end{bmatrix} \quad (31)$$

For example, in the expression (31), as to the element $W_{11}(z, t+\tau)$ of the matrix W(z, t+τ) representing the update value of the transmission weight, the terms of the fluctuation amount ($\Delta_{22}$, $\Delta_{23}$ and $\Delta_{32}$) of the channels other than $\Delta_{33}$ in the expression (21) becomes 0, and it can be simplified as $W_{11}(z, t+\tau)=H_{22}(z, t)\Delta_{33}(z, t+\tau)$. The same applies to $W_{12}(z, t+\tau)$, $W_{21}(z, t+\tau)$ and $W_{22}(z, t+\tau)$.

Here, as a wireless communication system of the prior art (referred to as a comparative example), the amount of calculation when calculating the transmission weight without using the update value of the transmission weight is compared with the amount of calculation when calculating the transmission weight by the method described in the present embodiment.

First, the amount of calculation when the transmission weight is recalculated without using the update value of the transmission weight can be obtained, for example, as follows. The complex multiplication count Mua for calculating adj(H(z, t)) is represented by the expression (32), where N is the number of antennas and $L_H$ is the number of paths for each channel between a plurality of antennas.

[Math. 35]

$$Mua=(N^2*(N-1)!)*L_H^{N-1} \quad (32)$$

Here, * indicates multiplication. Then, in the expression (32), $N^2$ indicates the number of elements to be calculated in the transposed adjugate matrix adj (H (z, t)), and (N−1)! indicates the multiplication count in each element, and $L_H^{N-1}$ indicates the multiplication count for $L_H$ paths.

Thus, in the method of the comparative example, as to the multiplication count Mua, when at least one of the number of antennas N and the number of paths $L_H$ for each channel between a plurality of antennas increases, the amount of calculation of the transmission weight becomes huge.

On the other hand, in the wireless communication system 100 according to the present embodiment, when fluctuation occurs in one channel with $\Delta_{33}$ as in the expression (30), the complex multiplication count Mub related to the calculation of the transmission weight (adj(H(z, t+τ))) is represented by the expression (33), where N is the number of antennas, $L_H$ is the number of paths for each channel between a plurality of antennas, and LA is the number of paths where fluctuation occurs (the number of paths exceeding the threshold) among the $L_H$ paths. It is assumed that channel fluctuation occurs only in the channel with $\Delta_{33}$, and when fluctuation occurs in a plurality of channels, the multiplication count in the expression (33) is required a plurality of times.

[Math. 36]

$$Mub=(N-1)^2*L_H^{N-2}*L_\Delta \quad (33)$$

Here, * indicates multiplication. Then, $(N-1)^2$ in the expression (33) indicates the multiplication count of the (N−1)×(N−1) matrix excluding the rows and columns of the elements of 0. For example, in the case of the expression (31) of N=3, the multiplication count $(3-1)^2$ of the 2×2 matrix excluding the rows and columns of the elements of 0 is obtained. $L_H^{N-2}$ in the expression (33) indicates the multiplication count for $L_H$ paths, and $L_\Delta$ indicates the number of paths where fluctuation occurs.

For example, in the expressions (32) and (33), assuming that N=3, $L_\Delta$=1, and $L_H$=3, the multiplication count Mua in the wireless communication system of the comparative example is 162 times, and the multiplication count Mub in the wireless communication system 100 according to the present embodiment is 12 times, and the amount of calculation when updating the transmission weight is significantly reduced. As the number of antennas N and the number of paths where fluctuation occurs LA increase, the multiplication count increases. The multiplication count mentioned above is in a case where fluctuation occurs in the channel with only $\Delta_{33}$, and when fluctuation occurs in a plurality of channels with other than $\Delta_{33}$, the multiplication count is required a plurality of times. The multiplication count in the comparative example depends only on the number of antennas and the number of paths for each channel because the transmission weight is recalculated under all conditions.

Here, it is not necessary to implement the threshold determination function which extracts only the paths whose fluctuation amount exceeds the threshold. When the threshold determination is not performed, the number of paths where fluctuation has occurred can be considered as the total number of paths ($L_A=L_H$), and the term $L_H^{N-2}*L_A$ in the expression (33) is $L_H^{N-2}*L_H=L_H^{N-1}$, which is the same as the term $L_H^{N-1}$ in the comparative example. But, even in this case, by calculating the update value of the transmission weight using the difference $\Delta_{nrnt}(z, t+\tau)$ as described in the expressions (24), (25) and the like, only the multiplications count corresponding to the term $(N-1)^2$ in the expression (33) is required as compared with the multiplication count corresponding to the term of $(N^2*(N-1)!)$ in the comparative example, therefore the amount of calculation is significantly reduced. For example, when N=3 and fluctuation occurs only in the channel with $\Delta_{33}$ as in the expression (30), the multiplication count is ¼ or less of the multiplication count in the comparative example.

Here, the multiplication count Mub in the present embodiment shown in the above-mentioned example is the multiplication count when fluctuation $\Delta_{33}$ occurs only in the channel between the antenna ATt(3) of the transmitting station device 101 and the antenna ATr(3) of the receiving station device 102, and for example, when fluctuation occurs in the channel with $\Delta_{33}$ and the channel with $\Delta_{22}$, the multiplication count is doubled (2×Mub). As such, the multiplication count increases according to the number of channels where fluctuation occurs, and the amount of calculation in the comparative example may be relatively smaller. Therefore, the wireless communication system 100 according to the present embodiment has a function of selecting the calculation method having the smaller multiplication count by performing the transmission weight calculation method determination process, as described later.

Whether or not fluctuation occurs in the channel can be determined by whether or not each element of the channel fluctuation amount $\Delta(z, t+\tau)$ is 0 when the channel fluctuation amount is calculated. Then, as described above, among the elements of the channel fluctuation amount $\Delta(z, t+\tau)$, the larger the number of elements which are 0 (the number of channels where the channel fluctuation amount is 0) is, the smaller the multiplication count is.

In this way, the wireless communication system 100 according to the present embodiment can significantly reduce the amount of calculation when updating the transmission weight.

It is desirable to implement the threshold determination in the transmitting station device 101 or the receiving station device 102, but as described above, depending on the conditions, even if it is not implemented, the effect of reducing the amount of calculation by using the difference can be obtained.

Here, regardless of whether the transmission beam forming process is performed using the transmission weight on the transmitting side, or the reception beam forming process is performed using the reception weight on the receiving side, the above-described effect is the same.

Configuration Example (1) of Wireless Communication System 100

Figure 4:
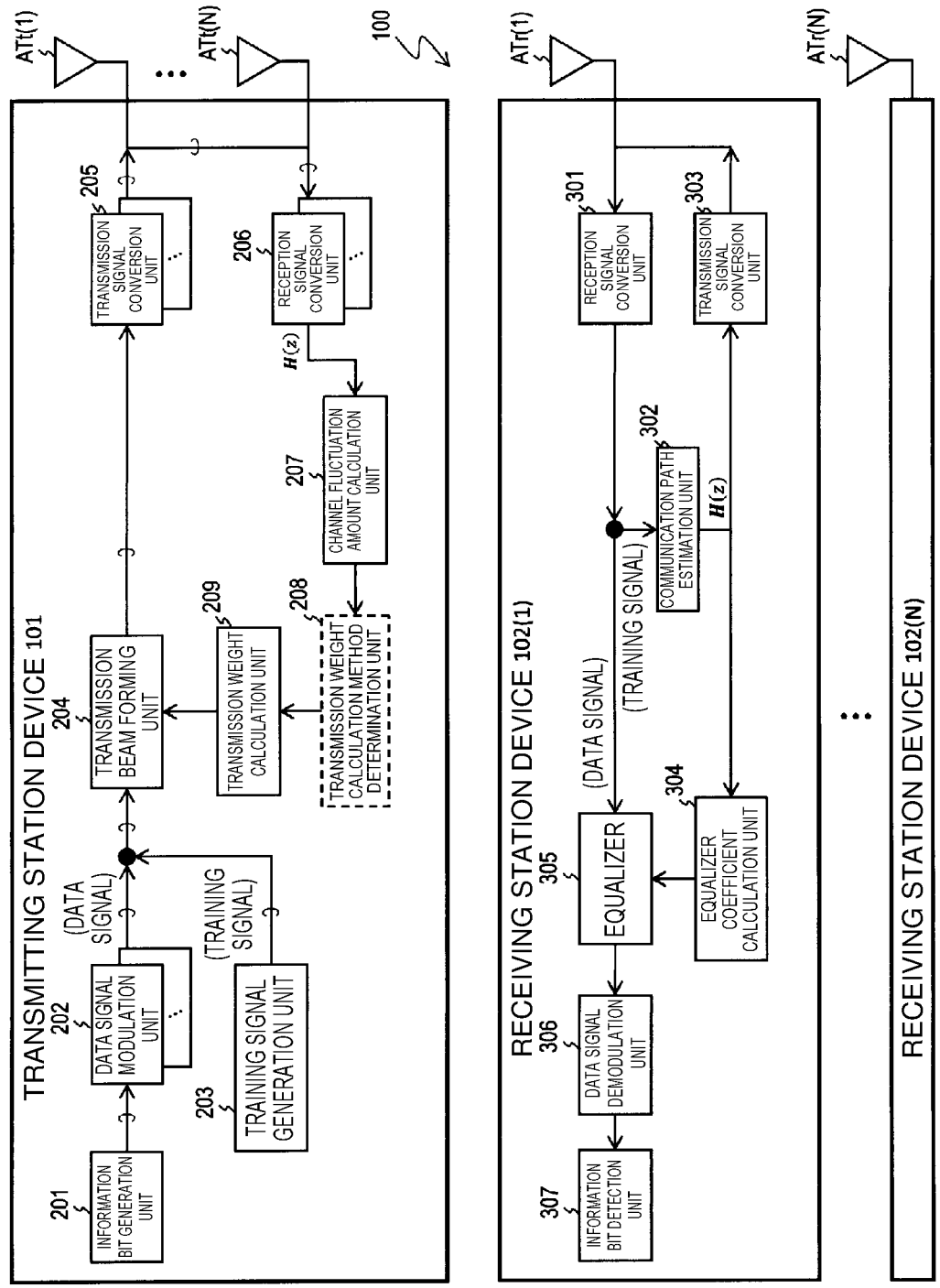
FIG. 4 is a diagram showing a configuration example (1) of the wireless communication system according to the present embodiment.

FIG. 4 shows a configuration example (1) of the wireless communication system 100 according to the present embodiment. The wireless communication system 100 is a MU-MIMO system where the transmitting station device 101 and the plurality of receiving station devices 102 communicate. The configuration example (1) is a system where the beam forming process is performed on the transmitting side.

In FIG. 4, the transmitting station device 101 has an information bit generation unit 201, data signal modulation units 202, a training signal generation unit 203, a transmission beam forming unit 204, transmission signal conversion units 205, reception signal conversion units 206, a channel fluctuation amount calculation unit 207, a transmission weight calculation method determination unit 208, a transmission weight calculation unit 209, and antennas ATt(1) to ATt(N).

The information bit generation unit 201 generates data information bits for each user to be transmitted to the receiving station device 102. The data information bits are, for example, a bit string corresponding to a data signal input from the outside (not shown), a data signal generated internally, or the like. The information bit generation unit 201 may have an error correction coding function for generating an error correction code at a predetermined code rate, an interleave function, and the like.

The data signal modulation unit 202 outputs a data signal obtained by modulating the bit string for each user output by the information bit generation unit 201, in a predetermined modulation mode (for example, quadrature amplitude modulation (QAM) or the like). In the transmitting station device 101 in FIG. 4, the data signal modulation unit 202 outputs a data signal obtained by modulating the bit string for each user output by the information bit generation unit 201. In the present embodiment, the transmitting station device 101 has as many data signal modulation units 202 as the number of antennas ATt (N).

The training signal generation unit 203 generates a known signal (training signal) for estimating the communication path response (CIR) and outputs it to the transmission beam forming unit 204 (training signal generation processing). The training signal is a predetermined signal obtained by modulating predetermined information such as a preamble for signal detection (for example, a specific pattern such as an alternating pattern of "01") in a modulation mode which is less susceptible to interference, such as PSK (Phase Shift Keying), and is used in the receiving station device 102 to estimate the CIR. The information of the training signal transmitted by the transmitting station device 101 is known to the receiving station device 102 in advance.

The transmission beam forming unit 204 uses the transmission weight calculated by the transmission weight calculation unit 209, which is described later, to perform a transmission beam forming process for suppressing inter-user interference with respect to the transmission signal. The transmission beam forming unit 204 may have a function of normalizing the transmission power.

The transmission signal conversion unit 205 performs processing for converting the signal output by the transmission beam forming unit 204 into a high frequency signal and transmitting it from the antenna ATt. Here, each data signal to the plurality of receiving station devices 102 output by the transmission beam forming unit 204 is converted into a high frequency signal respectively, and is transmitted from each of the antennas ATt(1) to ATt(N).

The reception signal conversion unit 206 frequency-converts the high frequency reception signal received by each antenna of the antennas ATt(1) to ATt(N) into the low frequency baseband signal. Here, in the present configuration example (1), the reception signal conversion unit 206 receives a signal including information of the CIR (H(z)) from each receiving station device 102, converts it into a baseband signal, and outputs it to the channel fluctuation amount calculation unit 207. The function of the demodulation unit which demodulates information of the CIR from the baseband signal may be possessed by the reception signal conversion unit 206 or the channel fluctuation amount calculation unit 207.

The channel fluctuation amount calculation unit 207 calculates the difference between the communication path responses CIR (H(z)) estimated in a manner of one following another in time on the receiving station device 102 side, and further, extracts as the channel fluctuation amount the path with the large fluctuation amount, about which the absolute value of the difference exceeds the threshold, among a plurality of paths (channel fluctuation amount calculation processing). Here, at the stage of calculating the first transmission weight when starting communication, the processing of the channel fluctuation amount calculation unit 207 is not performed. The channel fluctuation amount calculation unit 207 does not necessarily have to perform the threshold determination.

The transmission weight calculation method determination unit 208 determines the transmission weight calculation method according to the number of paths (including the number of channels) whose fluctuation amount exceeds the threshold, extracted by the channel fluctuation amount calculation unit 207, and the number of antennas, and selects the method using the prior art or the method of the present embodiment (transmission weight calculation method determination processing). This is because, in the comparison of the amount of calculation described above, the amount of calculation may be smaller in the method using the prior art, depending on the number of paths (including the number of channels) where fluctuation occurs and the number of antennas. If the update interval of the transmission weight is appropriate, the number of channels and the number of paths where fluctuation occurs are small, therefore the function of the transmission weight calculation method determination unit 208 is not necessarily required, and the method described in this embodiment may be always used. However, at the stage of calculating the first transmission weight when starting communication, the method of the prior art is selected.

The transmission weight calculation unit 209 calculates the transmission weight for performing the transmission beam forming process by the transmission beam forming unit 204, using the CIRs (H(z)) in a manner of one following another in time estimated by the communication path estimation unit 302 on the receiving station device 102 side (transmission weight calculation processing). Here, the transmission weight is calculated by determining the update value of the transmission weight using the difference between the CIRs (H(z)) calculated by the channel fluctuation amount calculation unit 207, and adding the update value to the current transmission weight, as described in the expressions (19) to (25) and the like. Further, when the channel fluctuation amount calculation unit 207 performs the threshold determination, the transmission weight calculation unit 209 calculates the update value of the transmission weight using as the channel fluctuation amount the path with the large fluctuation amount exceeding the threshold, as described in the expressions (26) to (31) and the like. Then, a new transmission weight obtained by adding the update value to the current transmission weight is output to the transmission beam forming unit 204. When the transmission weight calculation method determination unit 208 is included, the transmission weight calculation unit 209 calculates the transmission weight using the selected calculation method.

In this way, in the wireless communication system 100 according to the present embodiment, the transmitting station device 101 transmits a training signal for estimating the CIR, receives the estimation result of the CIR from the receiving station device 102, calculates the update value of the transmission weight based on the channel fluctuation amount calculated from the estimation results of the CIRs in a manner of one following another in time, and adds the update value to the current transmission weight to calculate the new transmission weight, therefore the amount of calculation related to update of the transmission weight can be reduced. Further, among a plurality of paths for the channel, only for the path whose fluctuation amount exceeds the threshold, update processing of the transmission weight is performed using the fluctuation amount of the path as the channel fluctuation amount, so that the amount of calculation related to update of the transmission weight is significantly reduced.

Next, each part of the receiving station device 102(1) is described. In the case of MU-MIMO shown in FIG. 4, N receiving station devices 102 with the same configuration as that of the receiving station device 102(1) are included.

In FIG. 4, the receiving station device 102(1) has a reception signal conversion unit 301, a communication path estimation unit 302, a transmission signal conversion unit 303, an equalizer coefficient calculation unit 304, an equalizer 305, a data signal demodulation unit 306, an information bit detection unit 307, and antennas ATr(1) to ATr(N).

The reception signal conversion unit 301 frequency-converts the high frequency signal received by the antenna Atr into a baseband signal, similarly to the reception signal conversion unit 206 of the transmitting station device 101. Here, the reception signal conversion unit 301 outputs the data signal and the training signal received from the transmitting station device 101 to the equalizer 305 and the communication path estimation unit 302 respectively, which are described later.

The communication path estimation unit 302 estimates the CIR (H(z, t)) based on the training signal transmitted from the transmitting station device 101 (communication path estimation processing). Here, the communication path estimation unit 302 of the receiving station device 102(1) estimates the CIRs ($H_{1,1}(Z, t)$, $H_{2,1}(z, t)$, . . . , $H_{N,1}(z, t)$) between the antennas ATt(1) to ATt(N) of the transmitting station device 101 and the antenna ATr(1). Then, the communication path estimation unit 302 transmits information of the estimated CIR from the transmission signal conversion unit 303 to the transmitting station device 101 side, and outputs it to the equalizer coefficient calculation unit 304. Similarly, the communication path estimation units 302 of the receiving station devices 102(2) to 102(N) estimate the CIRs between respective antennas, and transmit information of the estimated CIRs to the transmitting station device 101 side. Here, all the information of estimation result of the CIR is not transmitted to the transmitting station device 101 side, but only the CIR of the path where fluctuation occurs is transmitted to the transmitting station device 101 side by the threshold determination described above, so that the amount of feedback can be reduced.

The transmission signal conversion unit 303 converts information of the CIR (H(z)) and the like output by the communication path estimation unit 302 into a high frequency signal and transmits it from the antenna Atr. The function of the modulation unit which modulates information of the CIR into the baseband signal may be possessed by the transmission signal conversion unit 303 or the communication path estimation unit 302.

The equalizer coefficient calculation unit 304 calculates a tap coefficient (reception weight) for performing equalization processing of inter-symbol interference in the equalizer 305 (reception weight calculation processing). The method of calculating the reception weight is based on the equalization mode, but for example, the reception weight corresponds to det(H(z)) described in the expression (7) or the like. Then, the calculated reception weight is output to the equalizer 305. Here, the reception weight may be referred to as the equalization weight.

The equalizer 305 performs processing (equalization processing) for suppressing inter-symbol interference based on the reception weight (equalization weight) calculated by the equalizer coefficient calculation unit 304. Since whether or not the equalizer 305 is included and the type of the equalization mode are not directly related to the characteristics of the present embodiment, detailed description thereof is omitted.

The data signal demodulation unit 306 demodulates the data signal output by the equalizer 305 into information bits and outputs the bit string. The data signal demodulation unit 306 may include an error correction decoding function and a deinterleave function according to the function of the transmitting station device 101 side.

The information bit detection unit 307 outputs the received data obtained by converting the bit string output by the data signal demodulation unit 306 into digital data. The error correction decoding function or the deinterleave function may be performed on the information bit detection unit 307 side.

In this way, the wireless communication system 100 which performs SC-MIMO transmission shown in FIG. 4, can reduce the amount of calculation, by the channel fluctuation amount calculation unit 207 on the transmitting station device 101 side calculating as the channel fluctuation amount the difference between the CIRs in a manner of one following another in time estimated on the receiving station device 102 side, and performing update processing of the transmission weight. Further, the wireless communication system 100 can significantly reduce the amount of calculation related to update of the transmission weight by extracting, among a plurality of paths for each channel, only the path with the large fluctuation amount by means of performing the threshold determination, and using the fluctuation amount of the path as the channel fluctuation amount.

Configuration Example (2) of Wireless Communication System 100

Figure 5:
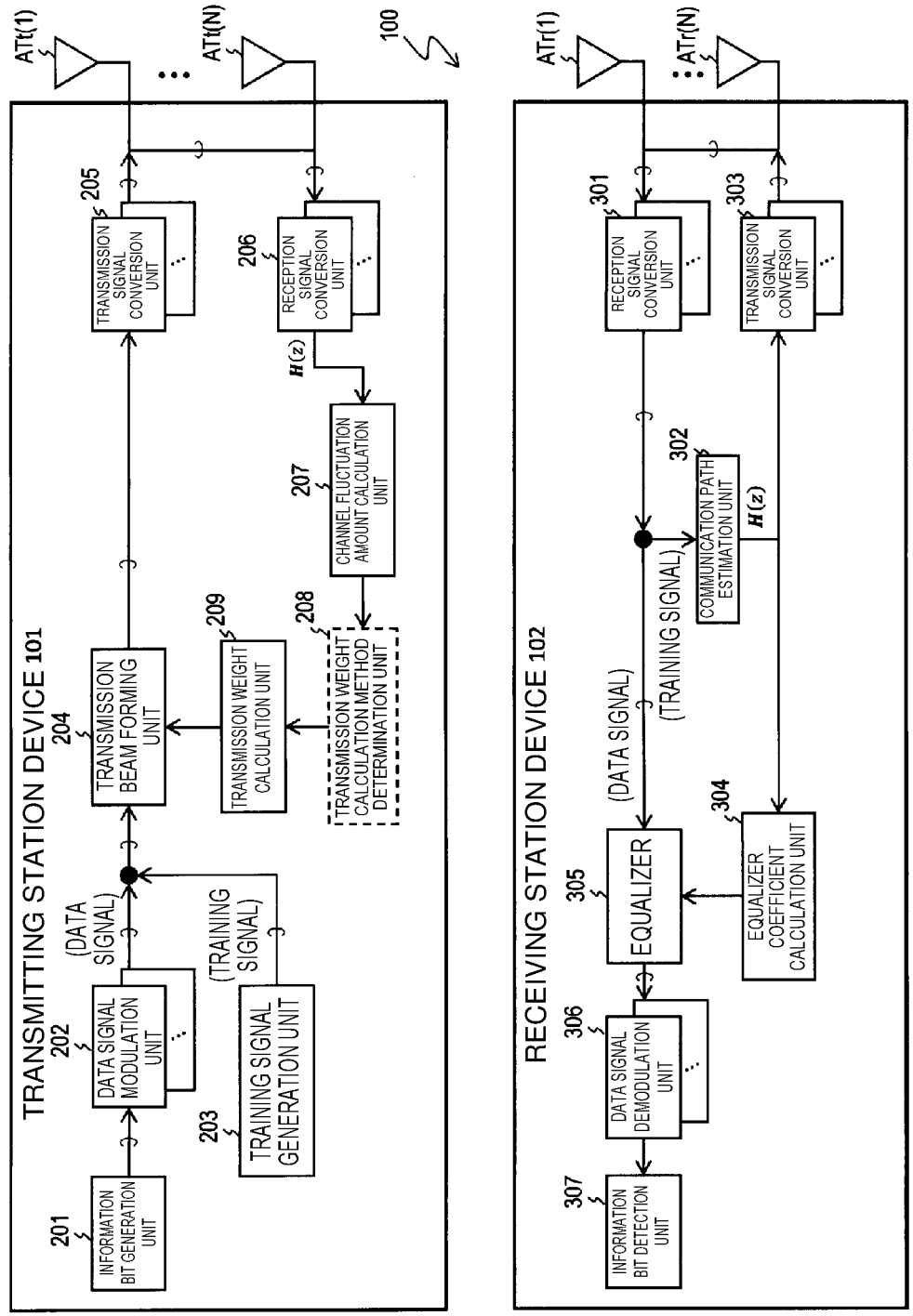
FIG. 5 is a diagram showing a configuration example (2) of the wireless communication system according to the present embodiment.

FIG. 5 shows a configuration example (2) of the wireless communication system 100 according to the present embodiment. Here, the difference between FIGS. 4 and 5 is whether the wireless communication system 100 is MU-MIMO or SU-MIMO, and FIG. 5 shows a configuration example of SU-MIMO. Each block of the configuration example (2) shown in FIG. 5 has the same function as that of the block with the same reference numeral in the configuration example (1) shown in FIG. 4. The configuration example (2) is a system where the beam forming process is performed on the transmitting side.

In FIG. 5, the configuration of the transmitting station device 101 is basically the same as that of the transmitting station device 101 in FIG. 4. In FIG. 4, the transmitting station device 101 communicates with a plurality of receiving station devices 102, i.e. the receiving station devices 102(1) to 102(N), but the transmitting station device 101 in FIG. 5 communicates with one receiving station device 102.

In FIG. 5, the receiving station device 102 has the same basic configuration and function as those of the receiving station device 102(1) shown in FIG. 4, but has N antennas ATr from the antenna ATr(1) to the antenna ATr(N), and has a function of receiving signals of a plurality of (N) streams. As such, each block of the receiving station device 102 shown in FIG. 5 corresponds to signals of a plurality of streams. For example, the reception signal conversion unit 301 converts each high frequency signal received by the plurality of antennas ATr into a baseband signal and outputs it to the communication path estimation unit 302 and the equalizer 305 respectively.

In FIG. 5, the communication path estimation unit 302 estimates the CIR based on the training signal transmitted from the transmitting station device 101, similarly to the communication path estimation unit 302 in FIG. 4. Here, the communication path estimation unit 302 in FIG. 5 estimates the CIRs ($H_{1,1}(z, t), H_{2,1}(z, t), \ldots, H_{N,N}(z, t)$) between the antennas ATt(1) to ATt(N) of the transmitting station device 101 and the antennas ATr(1) to ATr(N) of the receiving station device 102, and for example, determines H(z, T) shown in the expression (5). Then, the communication path estimation unit 302 transmits information of the estimated CIR from the transmission signal conversion unit 303 to the transmitting station device 101 side. As in the configuration example (1), all the information of estimation result of the CIR is not transmitted to the transmitting station device 101 side, but only the CIR of the path where fluctuation occurs is transmitted to the transmitting station device 101 side by the threshold determination described above, so that the amount of feedback can be reduced.

On the other hand, the equalizer 305 suppresses inter-symbol interference with the reception weight (det(H(z))) calculated by the equalizer coefficient calculation unit 304, with respect to the data signals of a plurality of streams output by the reception signal conversion unit 301, and outputs the data signals to the data signal demodulation unit 306. The data signal demodulation unit 306 demodulates each of the signals of a plurality of streams output from the equalizer 305 into information bits and outputs the bit string. The information bit detection unit 307 outputs the received data obtained by converting the bit strings of a plurality of streams output by the data signal demodulation unit 306 into digital data.

In this way, in the wireless communication system 100 of the configuration example (2) shown in FIG. 5, similarly to the wireless communication system 100 of the configuration example (1) described in FIG. 4, the transmitting station device 101 transmits a training signal for estimating the CIR, receives the estimation result of the CIR from the receiving station device 102, calculates the update value of the transmission weight based on the channel fluctuation amount calculated from the estimation results of the CIRs in a manner of one following another in time, and adds the update value to the current transmission weight to calculate the new transmission weight, therefore the amount of calculation related to update of the transmission weight can be reduced. Further, among a plurality of paths for each channel, only for the path whose fluctuation amount exceeds the threshold, update processing of the transmission weight is performed using the fluctuation amount of the path as the channel fluctuation amount, so that the amount of calculation related to update of the transmission weight is significantly reduced.

Configuration Example (3) of Wireless Communication System 100

Figure 6:
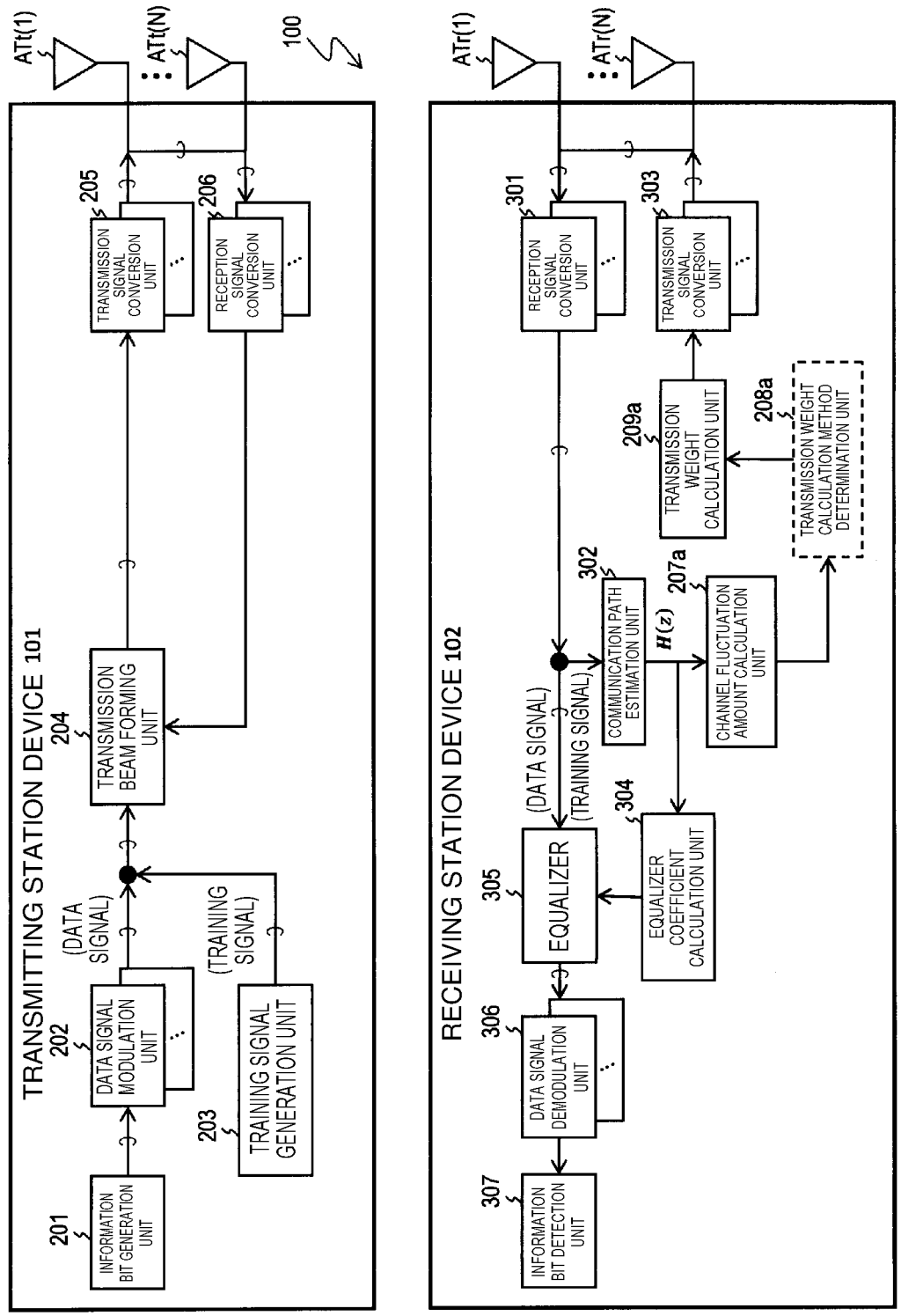
FIG. 6 is a diagram showing a configuration example (3) of the wireless communication system according to the present embodiment.

FIG. 6 shows a configuration example (3) of the wireless communication system 100 according to the present embodiment. Here, the wireless communication systems 100 in FIGS. 5 and 6 both show examples of SU-MIMO. Here, in the configuration example (2) of FIG. 5, the channel fluctuation amount calculation unit 207, the transmission weight calculation method determination unit 208, and the transmission weight calculation unit 209 are arranged on the transmitting station device 101 side, whereas in the configuration example (3) of FIG. 6, a channel fluctuation amount calculation unit 207a, a transmission weight calculation method determination unit 208a, and a transmission weight calculation unit 209a are arranged on the receiving station device 102 side. The channel fluctuation amount calculation unit 207a, the transmission weight calculation method determination unit 208a, and the transmission weight calculation unit 209a in the configuration example (3) have the same functions as those of the channel fluctuation amount calculation unit 207, the transmission weight calculation method determination unit 208, and the transmission weight calculation unit 209 in the configuration example (2). In FIGS. 5 and 6, the respective other blocks with the same reference numerals function in the same manner. The configuration example (3) is a system where the beam forming process is performed on the transmitting side.

In FIG. 6, the transmitting station device 101 has the information bit generation unit 201, the data signal modulation units 202, the training signal generation unit 203, the transmission beam forming unit 204, the transmission signal conversion units 205, the reception signal conversion units 206, and the antennas ATt(1) to ATt(N). In the configuration example (3) shown in FIG. 6, the reception signal conversion unit 206 receives information of the transmission weight from the receiving station device 102 side and outputs the transmission weight to the transmission beam forming unit 204.

Here, in the configuration example (3) of FIG. 6, the same operations as those in the configuration example (1) and the configuration example (2) are not described, and different parts are described.

In FIG. 6, the reception signal conversion unit 206 of the transmitting station device 101 receives a signal including information of the transmission weight from the receiving station device 102, converts it into a baseband signal, and outputs it to the transmission beam forming unit 204. The function of the demodulation unit which demodulates information of the transmission weight from the baseband signal may be possessed by the reception signal conversion unit 206 or the transmission beam forming unit 204. The transmission beam forming unit 204 performs a transmission beam forming process on the transmission signals of a plurality of streams using the input transmission weight.

In FIG. 6, the receiving station device 102 has the reception signal conversion units 301, the communication path estimation unit 302, the transmission signal conversion units 303, the equalizer coefficient calculation unit 304, the equalizer 305, the data signal demodulation units 306, and the information bit detection unit 307, the channel fluctuation amount calculation unit 207a, the transmission weight calculation method determination unit 208a, the transmission weight calculation unit 209a, and the antennas Atr(1) to Atr(N).

The communication path estimation unit 302 estimates the CIR based on the training signal transmitted from the transmitting station device 101. Here, the communication path estimation unit 302 of the receiving station device 102 estimates the CIRs ($H_{1,1}(Z, t)$, $H_{2,1}(z, t)$, ..., $H_{N,N}(Z, t)$) between the respective antennas ATt(1) to ATt(N) of the transmitting station device 101 and the respective antennas ATr(1) to ATr(N). Then, the communication path estimation unit 302 outputs information of the estimated CIR to the channel fluctuation amount calculation unit 207a and the equalizer coefficient calculation unit 304.

Similarly to the channel fluctuation amount calculation unit 207 in the configuration example (1) and the configuration example (2), the channel fluctuation amount calculation unit 207a calculates the difference between the CIRs estimated by the communication path estimation unit 302, and further, extracts the path with the large fluctuation amount, about which the absolute value of the difference exceeds the threshold (channel fluctuation amount calculation processing). Here, at the stage of calculating the first transmission weight when starting communication, the processing of the channel fluctuation amount calculation unit 207a is not performed. The channel fluctuation amount calculation unit 207a does not necessarily have to perform the threshold determination, similarly to the channel fluctuation amount calculation unit 207.

Similarly to the transmission weight calculation method determination unit 208 in the configuration example (1) and the configuration example (2), the transmission weight calculation method determination unit 208a determines the transmission weight calculation method according to the number of paths extracted by the channel fluctuation amount calculation unit 207a, and selects the method using the prior art or the method of the present embodiment. This function is not essential, and the method described in the present embodiment may always be used. Here, at the stage of calculating the first transmission weight when starting communication, the transmission weight calculation method determination unit 208a selects the method of the prior art.

Similarly to the transmission weight calculation unit 209 in the configuration example (1) and the configuration example (2), the transmission weight calculation unit 209a determines the update value of the transmission weight using the difference between the CIRs (H(z)) estimated by the communication path estimation unit 302, and calculates the new transmission weight by adding the update value to the current transmission weight (transmission weight calculation processing). Then, the newly calculated transmission weight is transmitted from the transmission signal conversion unit 303 to the transmission beam forming unit 204 on the transmitting station device 101 side.

In this way, in the wireless communication system 100 of the configuration example (3) shown in FIG. 6, similarly to the wireless communication system 100 of the configuration example (1) described in FIG. 4 and the configuration example (2) described in FIG. 5, the channel fluctuation amount calculation unit 207a can reduce the amount of calculation related to update of the transmission weight because the communication path estimation unit 302 calculates the channel fluctuation amount from the estimation results of the CIRs in a manner of one following another in time, and the transmission weight is calculated based on the channel fluctuation amount. Further, among a plurality of paths for each channel, only for the path whose fluctuation amount exceeds the threshold, update processing of the transmission weight is performed using the fluctuation amount of the path as the channel fluctuation amount, so that the amount of calculation related to update of the transmission weight is significantly reduced.

Configuration Example (4) of Wireless Communication System 100

Figure 7:
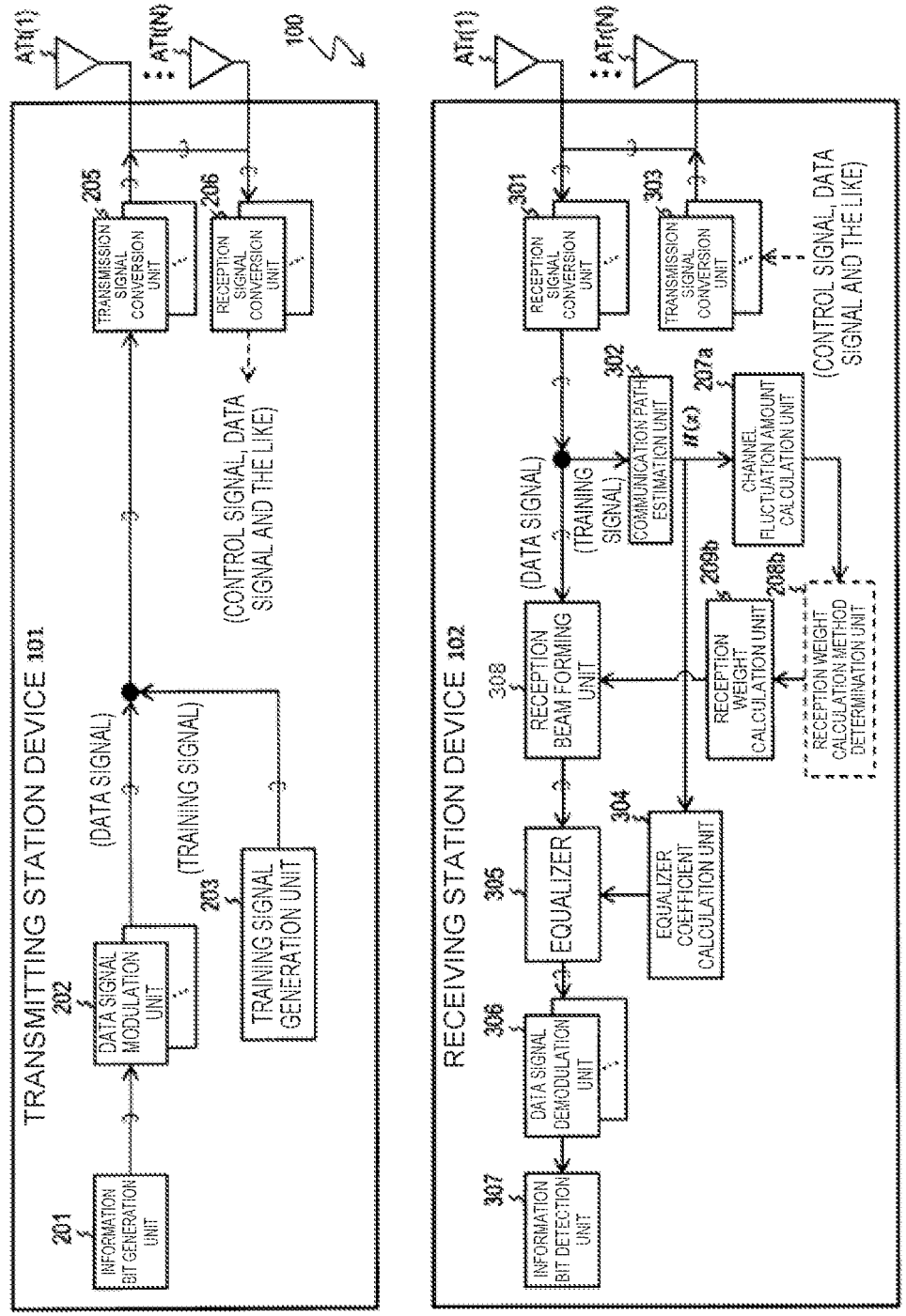
FIG. 7 is a diagram showing a configuration example (4) of the wireless communication system according to the present embodiment.

FIG. 7 shows a configuration example (4) of the wireless communication system 100 according to the present embodiment. Here, in the configuration example (3) of FIG. 6, the transmitting station device 101 is configured to include the transmission beam forming unit 204 to perform the transmission beam forming process, but the present configuration example (4) is a system where the receiving station device 102 includes a reception beam forming unit 308 to perform beam forming processes on the receiving side. In FIG. 7, each block with the same reference numeral as that in FIG. 6 functions in the same manner as in FIG. 6.

In FIG. 7, the transmitting station device 101 has the information bit generation unit 201, the data signal modulation units 202, the training signal generation unit 203, the transmission signal conversion units 205, the reception signal conversion units 206, and the antennas ATt(1) to ATt(N). The present configuration example (4) is different from the configuration example (3) of FIG. 6 in that the transmitting station device 101 transmits a data signal without forming a transmission beam.

Here, in the configuration example (4) of FIG. 7, the same operations as those in the configuration example (1), the configuration example (2), and the configuration example (3) are not described, and different parts are described.

In FIG. 7, the reception signal conversion unit 206 of the transmitting station device 101 receives the control signal, the data signal, and the like from the receiving station device 102, but the operations not related to the features of the present invention are not described.

In FIG. 7, the receiving station device 102 has the reception signal conversion units 301, the communication path estimation unit 302, the transmission signal conversion units 303, the equalizer coefficient calculation unit 304, the equalizer 305, the data signal demodulation units 306, the information bit detection unit 307, the reception beam forming unit 308, the channel fluctuation amount calculation unit 207a, a reception weight calculation method determination unit 208b, a reception weight calculation unit 209b, and the antennas Atr(1) to Atr(N).

Here, in the receiving station device 102, parts different from those in the configuration example (3) of FIG. 6 are described.

Similarly to the transmission weight calculation method determination unit 208a in the configuration example (3), the reception weight calculation method determination unit 208b determines the reception weight calculation method according to the number of paths extracted by the channel fluctuation amount calculation unit 207a, and selects the method using the prior art or the method of the present embodiment. This function is not essential, and the method described in the present embodiment may always be used. Here, at the stage of calculating the first reception weight when starting communication, the reception weight calculation method determination unit 208b selects the method of the prior art.

Similarly to the transmission weight calculation unit 209a in the configuration example (3), the reception weight calculation unit 209b determines the update value of the reception weight using the difference between the CIRs (H(z)) estimated by the communication path estimation unit 302, and calculates the new reception weight by adding the update value to the current reception weight (reception weight calculation processing). Then, the newly calculated reception weight is output to the reception beam forming unit 308.

In this way, in the wireless communication system 100 of the configuration example (4) shown in FIG. 7, similarly to the wireless communication system 100 of the configuration example (1) to the configuration example (3), the channel fluctuation amount calculation unit 207b can reduce the amount of calculation related to update of the reception weight because the communication path estimation unit 302 calculates the channel fluctuation amount from the estimation results of the CIRs in a manner of one following another in time, and the reception weight is calculated based on the channel fluctuation amount. Further, among a plurality of paths for each channel, only for the path whose fluctuation amount exceeds the threshold, update processing of the reception weight is performed using the fluctuation amount of the path as the channel fluctuation amount, so that the amount of calculation related to update of the reception weight is significantly reduced.

(Processing Example (1))

Figure 8:
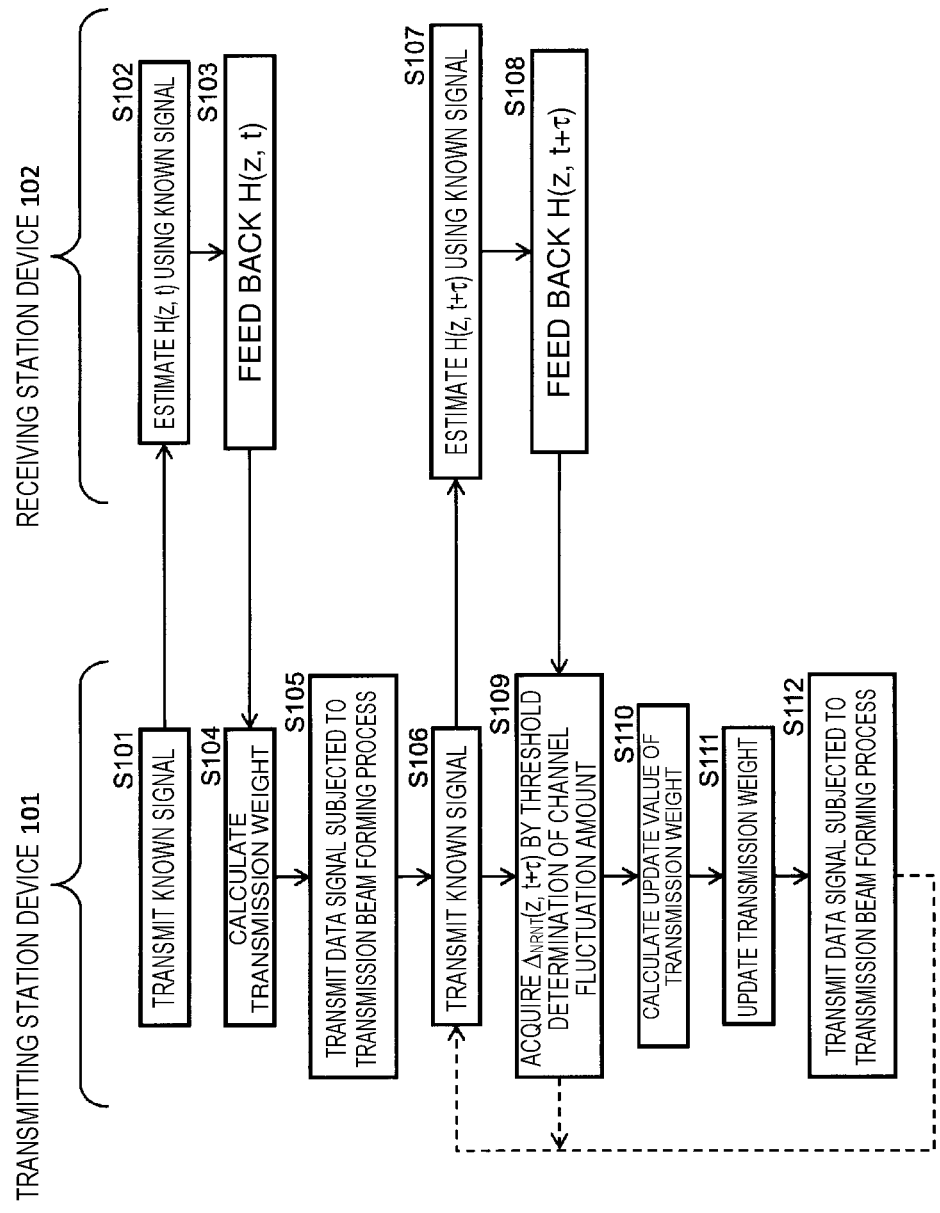
FIG. 8 is a diagram showing a processing example (1) of the wireless communication system according to the present embodiment.

FIG. 8 shows a processing example (1) of the wireless communication system 100 according to the present embodiment. The process shown in FIG. 8 is performed by each unit of the wireless communication system 100 described in the configuration example (1) of FIG. 4 and the configuration example (2) of FIG. 5. Here, the processing example (1) is a system where the beam forming process is performed on the transmitting station device 101 side. The processes from step S101 to step S105 are performed when starting communication.

In step S101, the training signal generation unit 203 of the transmitting station device 101 generates a known signal (training signal) before data communication and transmits it to the receiving station device 102.

In step S102, the communication path estimation unit 302 of the receiving station device 102 estimates the CIR (H(z, t)) using the known signal transmitted from the transmitting station device 101 in step S101.

In step S103, the communication path estimation unit 302 of the receiving station device 102 feeds back the estimated CIR (H(z, t)) to the transmitting station device 101.

In step S104, the transmission weight calculation unit 209 of the transmitting station device 101 calculates the transmission weight by a conventional method based on the CIR (H(z, t)) fed back from the receiving station device 102. The channel fluctuation amount calculation unit 207 and the transmission weight calculation method determination unit 208 output information of the CIR received from the receiving station device 102 side when starting communication to the transmission weight calculation unit 209 as it is.

In step S105, the transmission beam forming unit 204 of the transmitting station device 101 transmits the data signal subjected to the transmission beam forming process using the transmission weight calculated in step S104.

The processing so far is performed when starting communication, and during communication, the subsequent processing from step S106 to step S112 is repeatedly performed, and the transmission weight calculated in step S104 is updated.

In step S106, the training signal generation unit 203 of the transmitting station device 101 transmits a known signal which is not subjected to the transmission beam forming process, during the transmission of the data signal (during data communication).

In step S107, the communication path estimation unit 302 of the receiving station device 102 estimates the CIR (H(z, t+τ)) using the known signal transmitted from the transmitting station device 101 in step S106.

In step S108, the communication path estimation unit 302 of the receiving station device 102 feeds back the estimated CIR (H(z, t+τ)) to the transmitting station device 101. Here, all the information of estimation result of the CIR is not transmitted to the transmitting station device 101 side, but only the CIR of the path where fluctuation occurs is transmitted to the transmitting station device 101 side by the threshold determination described above, so that the amount of feedback can be reduced.

In step S109, the channel fluctuation amount calculation unit 207 of the transmitting station device 101 performs the threshold determination of the channel fluctuation amount, and acquires as the channel fluctuation amount $\Delta_{nrnt}(z, t+\tau)$ the fluctuation amount of the path whose fluctuation amount exceeds the threshold, among a plurality of paths for each channel. When there is no path about which the threshold is exceeded, the channel fluctuation amount calculation unit 207 of the transmission station device 101 may return to the process of step S106.

In step S110, the transmission weight calculation unit 209 of the transmitting station device 101 calculates the update value (W(z, t+τ)) of the transmission weight based on the channel fluctuation amount.

In step S111, the transmission beam forming unit 204 of the transmitting station device 101 updates the transmission weight in use, as described in the expression (19), based on the update value of the transmission weight calculated in step S110.

In step S112, the transmission beam forming unit 204 of the transmitting station device 101 transmits the data signal subjected to the transmission beam forming process using the updated transmission weight.

Here, after performing the processing of step S112, the processing returns to step S106 and the same processing is repeatedly performed. It is assumed that the interval for transmitting the known signal in step S106 is set in advance.

In this way, the wireless communication system 100 according to the present processing example (1) calculates the channel fluctuation amount from the estimation results of the CIRs in a manner of one following another in time, and calculates the update value of the transmission weight based on the channel fluctuation amount to update the transmission weight, so that the amount of calculation related to update of the transmission weight can be reduced. Further, among a plurality of paths for each channel, only for the path whose fluctuation amount exceeds the threshold, update processing of the transmission weight is performed using the fluctuation amount of the path as the channel fluctuation amount, so that the amount of calculation related to update of the transmission weight is significantly reduced.

(Processing Example (2))

Figure 9:
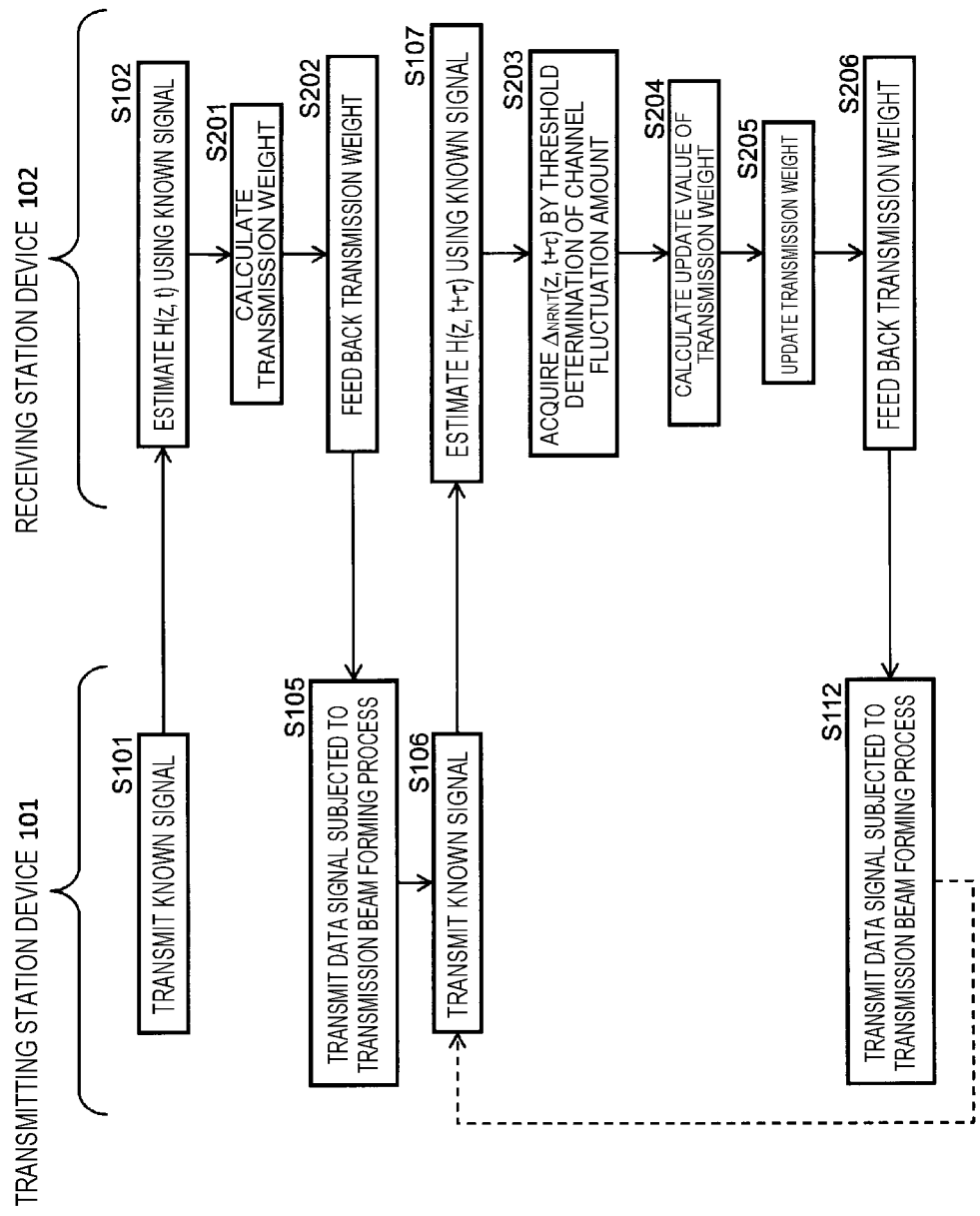
FIG. 9 is a diagram showing a processing example (2) of the wireless communication system according to the present embodiment.

FIG. 9 shows a processing example (2) of the wireless communication system 100 according to the present embodiment. The process shown in FIG. 9 is performed by each unit of the wireless communication system 100 described in the configuration example (3) of FIG. 6. Here, the processing example (2) is a system where the beam forming process is performed on the transmitting station device 101 side. In FIG. 9, the steps with the same reference numerals as those of the steps described in the processing example (1) of FIG. 8 perform the same processing as that of the processing example (1). The processes in steps S101, S102, S201, S202 and S105 are performed when starting communication.

Steps S101 and S102 perform the same processing as that of the step with the same reference numeral in the processing example (1).

In step S201, the transmission weight calculation unit 209a of the receiving station device 102 calculates the transmission weight by a conventional method based on the CIR (H(z, t)) estimated by the communication path estimation unit 302. Similarly to the processing example (1), the channel fluctuation amount calculation unit 207a and the transmission weight calculation method determination unit 208a output information of the CIR output by the communication path estimation unit 302 to the transmission weight calculation unit 209a as it is.

In step S202, the transmission weight calculation unit 209a of the receiving station device 102 feeds back the transmission weight calculated in step S201 to the transmitting station device 101.

Step S105 performs the same processing as that of the step with the same reference numeral in the processing example (1), and the transmission beam forming unit 204 of the transmitting station device 101 transmits the data signal subjected to the transmission beam forming process using the transmission weight fed back from the receiving station device 102 in step S202.

The processing so far is performed when starting communication, and during communication, the subsequent processing from step S106 to step S112 is repeatedly performed, and the transmission weight calculated in step S201 is updated.

Steps S106 and S107 perform the same processing as that of the step with the same reference numeral in the processing example (1).

In step S203, the channel fluctuation amount calculation unit 207a of the receiving station device 102 performs the threshold determination of the channel fluctuation amount, and acquires as the channel fluctuation amount $\Delta_{nrnt}(z, t+\tau)$ the fluctuation amount of the path whose fluctuation amount exceeds the threshold, among a plurality of paths for each channel. When there is no path about which the threshold is exceeded, the channel fluctuation amount calculation unit 207a may return to the process of step S107 and wait until the next known signal is received.

In step S204, the transmission weight calculation unit 209a of the receiving station device 102 calculates the update value (W(z, t+τ)) of the transmission weight based on the channel fluctuation amount.

In step S205, the transmission weight calculation unit 209a of the receiving station device 102 updates the transmission weight and calculates a new transmission weight.

In step S206, the transmission weight calculation unit 209a of the receiving station device 102 feeds back the transmission weight updated in step S205 to the transmitting station device 101.

Step S112 performs the same processing as that of the step with the same reference numeral in the processing example (1), and the transmission beam forming unit 204 of the transmitting station device 101 transmits the data signal subjected to the transmission beam forming process using the updated transmission weight.

Here, after performing the processing of step S112, the processing returns to step S106 and the same processing is repeatedly performed.

In this way, the wireless communication system 100 according to the present processing example (2), on the receiving station device 102 side, calculates the channel fluctuation amount from the estimation results of the CIRs in a manner of one following another in time, and calculates the update value of the transmission weight based on the channel fluctuation amount to update the transmission weight, so that the amount of calculation related to update of the transmission weight can be reduced. Further, among a plurality of paths for each channel, only for the path whose fluctuation amount exceeds the threshold, update processing of the transmission weight is performed using the fluctuation amount of the path as the channel fluctuation amount, so that the amount of calculation related to update of the transmission weight is significantly reduced.

(Processing Example (3))

Figure 10:
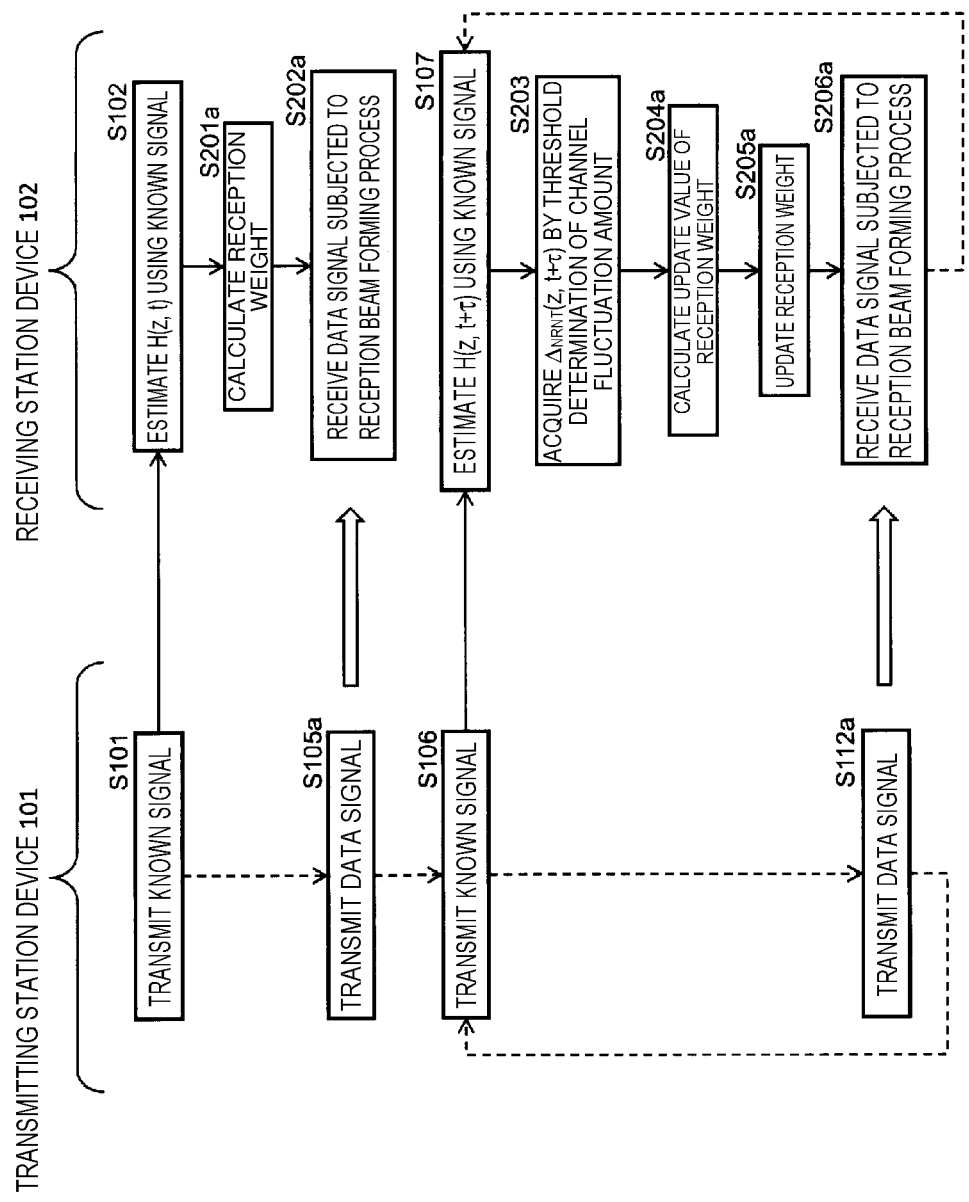
FIG. 10 is a diagram showing a processing example (3) of the wireless communication system according to the present embodiment.

FIG. 10 shows a processing example (3) of the wireless communication system 100 according to the present embodiment. The process shown in FIG. 10 is performed by each unit of the wireless communication system 100 described in the configuration example (4) of FIG. 7. Here, the present processing example (3) is a system where the beam forming process is performed on the receiving station device 102 side. In FIG. 10, the steps with the same reference numerals as those of the steps described in the processing example (2) of FIG. 9 perform the same processing as that of the processing example (2). The processes in steps S101, S102, S201a, S202a and S105a are performed when starting communication.

Steps S101 and S102 perform the same processing as that of the step with the same reference numeral in the processing example (2).

In step S201a, the reception weight calculation unit 209b of the receiving station device 102 calculates the reception weight by a conventional method based on the CIR (H(z, t)) estimated by the communication path estimation unit 302. Similarly to the processing example (2), the channel fluctuation amount calculation unit 207a and the reception weight calculation method determination unit 208b output information of the CIR output by the communication path estimation unit 302 to the reception weight calculation unit 209b as it is.

On the other hand, the transmitting station device 101 transmits a data signal in step S105a. The transmitted data signal has not been subjected to the transmission beam forming process.

In step S202a, the reception beam forming unit 308 performs a reception beam forming process on the data signal transmitted by the transmitting station device 101 in step S105a, using the reception weight calculated by the reception weight calculating unit 209b in step S201a, and receives the data signal subjected to the reception beam forming process.

The processing so far is performed when starting communication, and during communication, the subsequent processing from step S106 to step S112a is repeatedly performed, and the reception weight calculated in step S201a is updated.

Steps S106 and S107 perform the same processing as that of the step with the same reference numeral in the other processing examples.

Step S203 is the same as step S203 in the processing example (2), the channel fluctuation amount calculation unit 207a of the receiving station device 102 performs the threshold determination of the channel fluctuation amount, and acquires as the channel fluctuation amount $\Delta_{nrnt}(z, t+\tau)$ the fluctuation amount of the path whose fluctuation amount exceeds the threshold, among a plurality of paths for each channel. When there is no path about which the threshold is exceeded, the channel fluctuation amount calculation unit 207a may return to the process of step S107 and wait until the next known signal is received.

In step S204a, the reception weight calculation unit 209b of the receiving station device 102 calculates the update value (W(z, t+$\tau$)) of the reception weight based on the channel fluctuation amount.

In step S205a, the reception weight calculation unit 209b of the receiving station device 102 updates the reception weight and calculates a new reception weight.

On the other hand, in step S112a, the transmitting station device 101 transmits a data signal which has not been subjected to the transmission beam forming process, as in step S105a.

In step S206a, the reception beam forming unit 308 performs a reception beam forming process on the data signal transmitted by the transmitting station device 101 in step S112a, using the reception weight updated by the reception weight calculating unit 209b in step S205a, and receives the data signal subjected to the reception beam forming process.

Here, after performing the processing of step S112a, the processing returns to step S106 and the same processing is repeatedly performed.

In this way, the wireless communication system 100 according to the present processing example (3), on the receiving station device 102 side, calculates the channel fluctuation amount from the estimation results of the CIRs in a manner of one following another in time, and calculates the update value of the reception weight based on the channel fluctuation amount to update the reception weight, so that the amount of calculation related to update of the reception weight can be reduced. Further, among a plurality of paths for each channel, only for the path whose fluctuation amount exceeds the threshold, update processing of the reception weight is performed using the fluctuation amount of the path as the channel fluctuation amount, so that the amount of calculation related to update of the reception weight is significantly reduced.

As described in each embodiment mentioned above, the wireless communication system, the wireless communication method, the transmitting station device, and the receiving station device according to the present invention can, in a wireless communication system which performs SC-MIMO transmission, significantly reduce the amount of calculation related to update of a weight, by calculating an update value of the weight used in the beam forming process performed at the transmitting station device or the receiving station device based on the channel fluctuation amount between the communication path responses estimated in a manner of one following another in time, and further, calculating the update value using only the path for the channel with the large fluctuation amount.

In the embodiments described above, the case where the FIR type transmission beam forming process is performed has been described, but it can be similarly applied to any wireless communication system which performs beam forming.

REFERENCE SIGNS LIST

100 Wireless communication system
101 Transmitting station device
102 Receiving station device
201 Information bit generation unit
202 Data signal modulation unit
203 Training signal generation unit
204 Transmission beam forming unit
205 Transmission signal conversion unit
206 Reception signal conversion unit
207, 207a Channel fluctuation amount calculation unit
208, 208a Transmission weight calculation method determination unit
208b Reception weight calculation method determination unit
209, 209a Transmission weight calculation unit
209b Reception weight calculation unit
301 Reception signal conversion unit
302 Communication path estimation unit
303 Transmission signal conversion unit
304 Equalizer coefficient calculation unit
305 Equalizer
306 Data signal demodulation unit
307 Information bit detection unit
308 Reception beam forming unit
ATt, ATr Antenna

The invention claimed is:

1. A wireless communication system which performs single carrier MIMO transmission, wherein
a transmitting station device at least comprises
a training signal generation unit which generates a known signal, and
a receiving station device at least comprises a communication path estimation unit which estimates a communication path response from the known signal transmitted by the transmitting station device,
a beam forming unit which performs a beam forming process using a weight to suppress inter-stream interference,
a channel fluctuation amount calculation unit which calculates as a channel fluctuation amount a difference between the communication path responses estimated in a manner of one following another in time by the communication path estimation unit, and
a weight calculation unit which calculates a new weight using an updated value of the weight calculated based on the channel fluctuation amount.

2. The wireless communication system according to claim 1, wherein
the channel fluctuation amount calculation unit extracts a path about which the absolute value of the difference between the communication path responses estimated in a manner of one following another in time by the communication path estimation unit exceeds a predetermined threshold, and calculates the fluctuation amount of the path as the channel fluctuation amount.

3. A wireless communication method for performing single carrier MIMO transmission, wherein
a transmitting station device at least performs
a training signal generation process for generating a known signal, and
a receiving station device at least performs a communication path estimation process for estimating a communication path response from the known signal transmitted by the transmitting station device,
a beam forming process for performing a beam forming using a weight to suppress inter-stream interference,
a channel fluctuation amount calculation process for calculating as a channel fluctuation amount a difference between the communication path responses estimated in a manner of one following another in time by the communication path estimation process, and
a weight calculation process for calculating a new weight using an updated value of the weight calculated based on the channel fluctuation amount.

4. The wireless communication method according to claim 3, wherein
the channel fluctuation amount calculation process extracts a path about which the absolute value of the difference between the communication path responses estimated in a manner of one following another in time by the communication path estimation process exceeds a predetermined threshold, and calculates the fluctuation amount of the path as the channel fluctuation amount.

5. A transmitting station device which performs single carrier MIMO transmission between the transmitting station device and a receiving station device, comprising
a training signal generation unit which generates a known signal,
a beam forming unit which performs a beam forming process using a weight to suppress inter-stream interference,
a channel fluctuation amount calculation unit which calculates as a channel fluctuation amount a difference between the communication path responses estimated in a manner of one following another in time by the receiving station device which receives the known signal, and
a weight calculation unit which calculates a new weight using an updated value of the weight calculated based on the channel fluctuation amount.

6. The transmitting station device according to claim 5, wherein the channel fluctuation amount calculation unit extracts a path about which the absolute value of the difference between the communication path responses estimated in a manner of one following another in time by the receiving station device exceeds a predetermined threshold, and calculates the fluctuation amount of the path as the channel fluctuation amount.

7. A receiving station device which performs single carrier MIMO transmission which performs a beam forming process using a weight to suppress inter-stream interference, comprising
a communication path estimation unit which estimates a communication path response from a known signal received from the transmitting station device,
a channel fluctuation amount calculation unit which calculates as a channel fluctuation amount a difference between the communication path responses estimated in a manner of one following another in time by the communication path estimation unit, and
a weight calculation unit which calculates a new weight using an updated value of the weight calculated based on the channel fluctuation amount, and when the beam forming process is performed on the side of the receiving station device, outputs the new weight to the beam forming unit, and when the beam forming process is performed on the side of the transmitting station device, transmits the new weight to the transmitting station device.

8. The receiving station device according to claim 7, wherein the channel fluctuation amount calculation unit extracts a path about which the absolute value of the difference between the communication path responses estimated in a manner of one following another in time by the communication path estimation unit exceeds a predetermined threshold, and calculates the fluctuation amount of the path as the channel fluctuation amount.

* * * * *